US 10,037,122 B2

(12) United States Patent
Dyar et al.

(10) Patent No.: US 10,037,122 B2
(45) Date of Patent: Jul. 31, 2018

(54) CANVAS LAYOUT ALGORITHM

(71) Applicant: Oracle International Corporation, Redwood Shores, CA (US)

(72) Inventors: Samuel Stephen Dyar, Miami, FL (US); Bo Jonas Birger Lagerblad, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 367 days.

(21) Appl. No.: 14/866,308

(22) Filed: Sep. 25, 2015

(65) Prior Publication Data

US 2016/0092084 A1   Mar. 31, 2016

Related U.S. Application Data

(60) Provisional application No. 62/056,423, filed on Sep. 26, 2014, provisional application No. 62/079,363, filed on Nov. 13, 2014.

(51) Int. Cl.
*G06F 3/048*   (2013.01)
*G06F 3/0481*  (2013.01)
(Continued)

(52) U.S. Cl.
CPC .......... *G06F 3/0481* (2013.01); *G06F 3/0484* (2013.01); *G06F 9/4443* (2013.01); *G06F 9/451* (2018.02)

(58) Field of Classification Search
CPC ...... G06F 3/0482; G06F 9/451; G06F 17/212; G06F 17/2247; H04L 41/22
See application file for complete search history.

(56) References Cited

U.S. PATENT DOCUMENTS 8,127,248 B2   2/2012   Ording et al.
8,402,381 B2   3/2013   Berg et al.
(Continued)

FOREIGN PATENT DOCUMENTS

WO   1999061977 A1   12/1999

OTHER PUBLICATIONS

Kustanowitz, "Bi-level Hierarchical Layouts for Photo Libraries: Algorithms for Design Optimization with Quantum Content" retrieved from http://hcil2.cs.umd.edu/trs/2005-21/2005-21.pdf undated, 12 pages.

(Continued)

*Primary Examiner* — Claudia Dragoescu
(74) *Attorney, Agent, or Firm* — Kilpatrick & Townsend LLP

(57) ABSTRACT

Embodiments are directed to automatic layout organization where various visualizations within a canvas layout can be dynamically rearranged or modified in dimension upon a user specified modification to maximize usability. Some embodiments display a graphical user interface (GUI) including multiple components in a display area, where each component has one or more initial dimensions. In response to an event, embodiments can determine an edge corresponding to the event. Some embodiments determine a box based on the edge, the box enclosing a portion of the display area that is less than the entire display area. Certain embodiments determine a set of components corresponding to the box, the set of components being fewer than all of the components. Embodiments may redraw the GUI such that the set of components is redrawn, where a dimension of each component of the set of components is different from an initial dimension of the component.

14 Claims, 17 Drawing Sheets

(51) Int. Cl.
    *G06F 9/451*     (2018.01)
    *G06F 9/44*     (2018.01)
    *G06F 3/0484*     (2013.01)

(56) References Cited

U.S. PATENT DOCUMENTS

| | | |
|---|---|---|
| 8,676,864 B2 | 3/2014 | Lulewicz |
| 8,924,888 B2 | 12/2014 | Hanna |
| 2005/0237321 A1 | 10/2005 | Young et al. |
| 2008/0218532 A1* | 9/2008 | Young .................. G06F 9/4443 345/660 |
| 2010/0293501 A1* | 11/2010 | Russ .................. G06F 3/04886 715/803 |
| 2014/0359425 A1* | 12/2014 | van der Molen . G06F 17/30592 715/234 |

OTHER PUBLICATIONS

"Prepare Pages and Dashboards", Platfora retrieved from http://documentation.platfora.com/ undated, 8 pages.

"Power View Design Experience", TechNet Microsoft retrieved from https://technet.microsoft.com/en-us/library/hh231518(v=sql.110).aspx Apr. 21, 2015, 4 pages.

"Power View Design Tips", TechNet Microsoft retrieved from https://support.office.com/en-us/artcle/Power-View-design-tips-3f949db8-c7a-4ec8-880c-bb9e396c9fb9?ui=en-US&rs=en-ZA&ad=ZA Apr. 21, 2015, 7 pages.

"About Sizing and Positioning" Adobe retrieved from http://help.adobe.com Apr. 21, 2015, 7 pages.

Dundas Data Visualization, Inc., "Change the Height of a Control or Canvas Dynamically Based on the Data Returned" retrieved from http://support.dundas.com/Dashboard5.change_datagrid_height_runtime.ashx Apr. 21, 2015, 3 pages.

\* cited by examiner

CANVAS LAYOUT ALGORITHM

CROSS-REFERENCES TO RELATED APPLICATIONS

This application is a non-provisional application and claims the benefit and priority of U.S. Provisional Application No. 62/056,423, filed on Sep. 26, 2014, titled "CANVAS LAYOUT ALGORITHM," and U.S. Provisional Application No. 62/079,363, filed on Nov. 13, 2014, titled "VISUAL ANALYZER SYSTEM," both which are herein incorporated by reference in their entirety for all purposes.

BACKGROUND

Modifying and presenting various components in a canvas layout in a manner that is non-intrusive and pleasing to a user presents significant challenges as there are many variations in which components can be adjusted to be presented to a user when the user makes a modification to the canvas layout.

SUMMARY

Embodiments of the present invention are directed to techniques (e.g., a system, a method, a memory or non-transitory computer readable medium storing code or instructions executable by one or more processors) for arranging one or more visualizations in a canvas layout. Some embodiments may display a graphical user interface (GUI) such as a canvas layout in a display area. The GUI can include a number of components such as a visualization. Each of the components can have one or more initial dimensions. In response to an event, such as an insertion, removal, or repositioning of a visualization, certain embodiments may determine an edge corresponding to the event. Some embodiments may determine a box based on the edge where the box encloses a portion of the display area that is less than the entire display area. Certain embodiments may determine a set of components corresponding to the box, where the set of components includes fewer components than all of the components. Embodiments may then redraw the GUI such that the set of components is redrawn. In some embodiments, a dimension of each component of the set of components is different from an initial dimension of the component.

Some embodiments provide techniques (e.g., a method, a system, non-transitory computer-readable medium storing code or instructions executable by one or more processors) for determining and intelligently resizing one or more visualizations in a canvas layout to accommodate a modification to the layout (e.g., an insertion or removal of a visualization, a change in a configuration of the layout) specified by a user. One such technique can include displaying, by one or more processors, a graphical user interface (GUI) in a display area, the GUI comprising a plurality of components, wherein each of the plurality of components has one or more initial dimensions; in response to an event, determining an edge corresponding to the event; determining a box based on the edge, wherein the box encloses a portion of the display area that is less than the entire display area; determining a set of components corresponding to the box, the set of components being fewer than all of the plurality of components; and redrawing the GUI such that the set of components is redrawn, wherein a dimension of each component of the set of components is different from an initial dimension of the component.

In some embodiments, the event can include one of an insertion of a component, a deletion of a component, a repositioning of a component, or a resizing of a component. In certain embodiments, at least one dimension of each of the set of components corresponding to the box can be resized at a same percentage, and wherein components outside of the box are not resized. In some embodiments, determining the box can include identifying one or more perpendicular edges that intersect the ends of the edge corresponding to the event; determining the shorter edge of the one or more perpendicular edges; and identifying a portion of the display area encompassing the edge corresponding to the event and the shorter edge, wherein the box is determined by determining a boundary for the portion of the display area.

In some embodiments, the edge corresponding to the event is visually shown to the user, and wherein a length of the edge may be determined based on a movement of the cursor. In certain embodiments, the technique can further include determining one or more new dimensions of each of the set of components for the set of components to be redrawn. In some embodiments, determining the one or more new dimensions can include calculating a maximum number of components within the box that are intersected by a line perpendicular to the edge corresponding to the event; determining whether the edge corresponding to the event is a horizontal edge or a vertical edge; scaling a height of each of the set of components if the edge corresponding to the event is a horizontal edge; and scaling a width of each of the set of components if the edge corresponding to the event is a vertical edge. In certain embodiments, each component is a data visualization.

DETAILED DESCRIPTION

Figure 1:
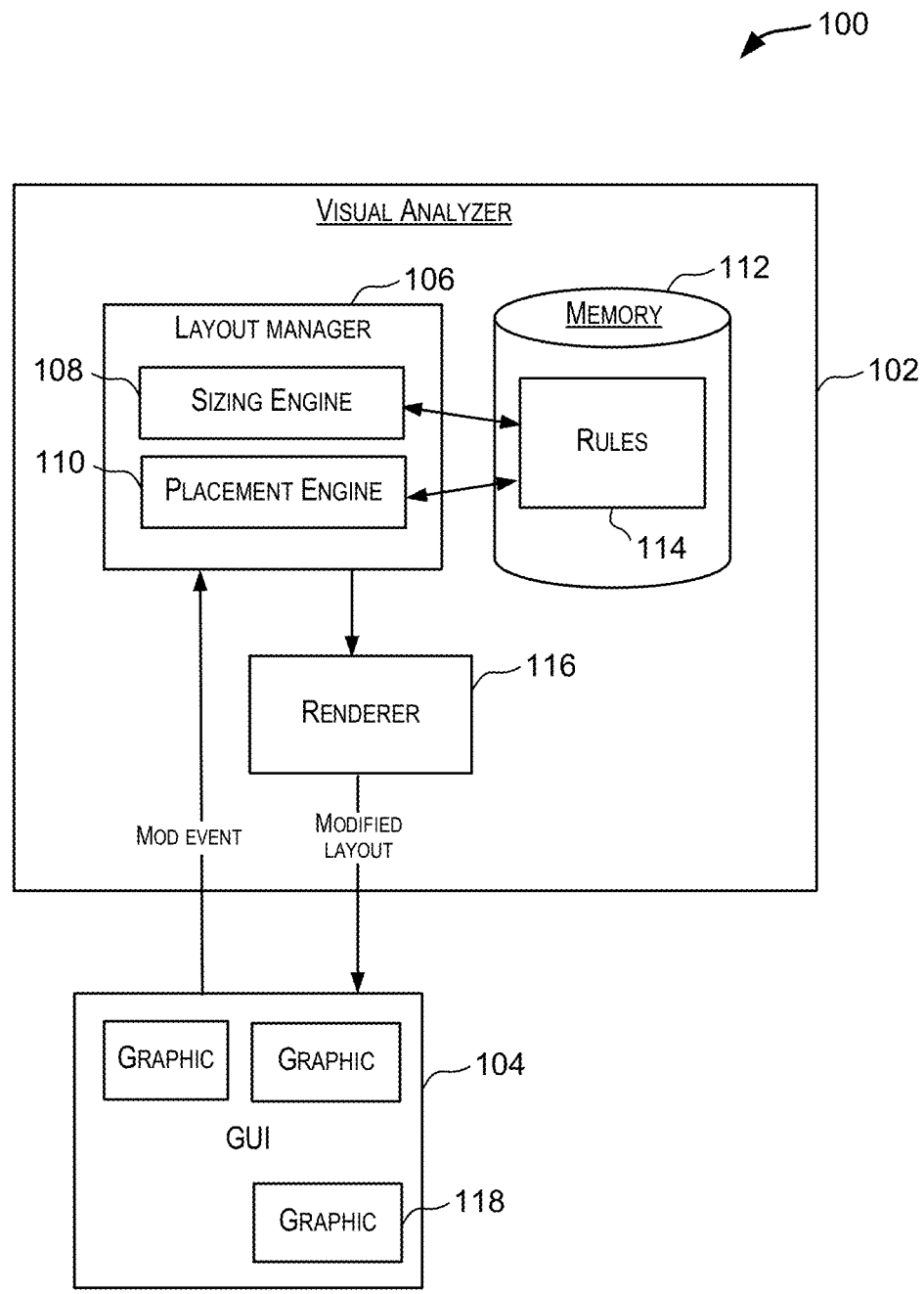
FIG. 1 illustrates an example block diagram of a system in accordance with certain embodiments of the present invention.

Embodiments of the present invention are directed to techniques (e.g., a system, a method, a memory or non-transitory computer readable medium storing code or instructions executable by one or more processors) for arranging one or more visualizations in a canvas layout. Some embodiments may display a graphical user interface (GUI) such as a canvas layout in a display area. The GUI can include a number of components such as a visualization. Each of the components can have one or more initial dimensions. In response to an event, such as an insertion, removal, or repositioning of a visualization, certain embodiments may determine an edge corresponding to the event. Some embodiments may determine a box based on the edge where the box encloses a portion of the display area that is less than the entire display area. Certain embodiments may determine a set of components corresponding to the box, where the set of components includes fewer components than all of the components. Embodiments may then redraw the GUI such that the set of components is redrawn. In some embodiments, a dimension of each component of the set of components is different from an initial dimension of the component.

A visual analyzer system in some embodiments can modify a dimension or a position of one or more visualizations displayed in a display area of a canvas layout to accommodate a user's request such as an insertion, removal, and repositioning of a visualization. Additional examples of a user's request can include switching positions of visualizations, resizing one or more visualizations, etc. Some embodiments can minimize the number of visualizations affected (e.g., that is less than all the visualizations in the display area) while ensuring that the visualizations being displayed looks proportional, non-intrusive and pleasing to a user's eye where the modifications fall within the user's expectations.

In some embodiments, a visual analyzer system can present one or more visualizations to a user via a visual analyzer application presented by a web browser (e.g., on a mobile device). In certain embodiments, a visualization is a visual representation of some data. In one embodiment, a visualization can display graphic elements, shapes and/or text. Examples of a visualization may include a table, a cross table, a graphical table, a bar chart, a line chart, a combination chart, a pie chart, a scatterplot, a map chart, a treemap, a heat map, a parallel coordinate plot, a summary table, a box plot, a text area, a user created or customizable chart, etc. The visual analyzer system may generate a visualization with multiple graphical attributes (also referred to as edges) that each correspond to a specified dimension. For example, a visual analyzer application can generate a bar chart with color, axis, size attributes that each corresponds to a dimension specified by a user such as time, sales, and entities. Each dimension may also have one or more dimension members, such as years 2009, 2010, 2011, company names X, Y, Z, and different types of products, etc.

Each visualization can include values for multiple dimensions of data from one or more columns in a database in some embodiments. A database can be a relational database that includes one or more tables. A table can have a set of rows and a set of columns. A dimension can correspond to a column of a table (or a database) while a record can correspond to a row of a table (or a database). In some embodiments, the visual analyzer application user interface (e.g., displayed through a web browser) can provide a projection of one or more databases. The user can identify one or more dimensions of data available in the one or more databases and request the visual analyzer application to generate a visual representation that represents the one or more dimensions of data retrieved from the databases.

In some embodiments, a visualization can have one or more edges (also sometimes referred to as an attribute) that represent the various dimensions (also referred to as criteria or columns of a database) of the visualization. A common set of edges can include row (also referred to as x-axis), column (also referred to as y-axis), category, values, color shape, size, etc. For example, a scatter chart may use all of those edges. A bar chart may use row, column, category, values, color, and size. A pivot table may use all of the common set of edges except for detail. A map may use row, column, category, color (map shape), color (bubble), and size. Different dimensions can include revenue, brand, year, company name, product type, etc. A dimension can be represented by an edge of a visualization. For example, a brand dimension can be represented by the color edge of a pie chart (or any other type of visualization), a revenue dimension can be shown in the values edge of a bar chart (or any other type of visualization), a year dimension can be shown in the rows edge (e.g., trellis rows that are good for small multiples), a company dimension can be shown in the columns edge (e.g., trellis columns), a product type dimension can be represented by the shape edge where each distinct value (also referred to as dimension member) is assigned a shape (e.g., circle, square, diamond, etc.), etc.

Each visualization may have configuration information that includes one or more edge identifiers identifying the edges of a visualization, one or more edge values corresponding to each edge, and one or more edge tags for each edge. The edge identifiers identifying the edges of a visualization can include a visualization type, a color, a size, an area, x-axis, y-axis, geo-coordinates, etc. Different visualizations of different visualization types may have a different set of edges. For instance a pie chart can have the following edges: color, size, etc. while a bar chart may have the following edges: x/col, y/row, color, category, values, color, size, etc.

Each edge can have one or more edge values and one or more edge tags (also referred to as functional tags or just tags). In some embodiments, the functional tags can be properties of edges on a visualization that describe what those edges do to a data column. In some embodiments, the edge tag can indicate whether an edge is a required edge or not a required edge for a visualization. If the edge tag indicates that an edge is a required edge, then the edge must have a value for the visualization to render in some embodiments. Certain embodiments may not have any required edges for any visualization.

The visual analyzer system can generate one or more visualizations based on one or more dimensions of data specified by a user. For example, the user may specify multiple dimensions such as time, sales, and entities to be represented by a visualization. The visual analyzer system may then generate a visualization with multiple edges (also referred to as graphical attributes) that each correspond to a specified dimension. For example, a visual analyzer application can generate a bar chart with color, axis, size edges that each corresponds to a dimension specified by a user such as time, sales, and entities, respectively. As described, the visual representation may be a pie chart, bar chart, or any other type of graphic where different edges such as color, axis, size, etc. can represent the desired dimensions specified by the user.

In certain embodiments, the visual analyzer system can offer users the flexibility to easily design reports with the ability to produce pixel-perfect layouts. In some embodiments, the visual analyzer system may support one or more layout managers including a split layout manager, a freeform layout manager, a grid layout, and custom plugin layout managers. In certain embodiments the visual analyzer system may include a plugin adapter that enables a user to provide a custom plugin layout. The flexibility of the visual analyzer system can accommodate the user-supplied custom plugin layout by allowing a user to use the various tools provided by the visual analyzer system to interact with the user-supplied custom plugin layout in some embodiments.

Some embodiments provide a split layout that can enable users to quickly build up a familiar grid-like layout that stretches to the available viewing area. Freeform layout can allow users to create pixel perfect layouts, but may require more user actions to achieve this. In some embodiments, the split layout can resemble and behave similarly to a layout consisting of nested splitters (although the underlying structure is not related to splitters).

In some embodiments, a split layout algorithm (also referred to as tiled layout algorithm) can manage placement, organization, and sizing of non-overlapping tiles contained in a larger rectangular space (also referred to as a display area of a canvas layout). Split layout and rectangular grid layouts may look similar and behave similarly in the sense that they both have cells that do not overlap and that the cells are sized and positioned to fill a bounding rectangle without leaving any whitespace. However, a split layout may use shared edges between visualizations to size and position the visualizations while the grid layout relies on a row and columns structure. This key difference between the two types of layouts enables the split layout to achieve more flexibility in modifying the configuration and dimensions of its tiles as opposed to the traditional row/column based grid layouts. The layout structure of a split layout enables edges between visualizations to be adjusted to resize the visualizations that share an edge. The interaction with and adjustment of edges between visualizations need not be affected by set rows and columns in some embodiments.

Some embodiments provide a set of rules in handling interaction with one or more edges in a split layout. In some embodiments, an edge cannot have "whitespace" on either side of it. In certain embodiments, the split layout may only track unit edges where a unit edge is defined to be the smallest edge that splits two or more visualizations and has no "whitespace" on either side of it. A full edge can be the largest uninterrupted span of unit edges, e.g., an edge that spans from one side of a canvas layout to another side of the canvas layout. When an edge is used for an interaction (e.g., adding a new viz, inserting a viz, or resizing a vizs), some embodiments may use an imaginary bounding rectangle to determine which vizs will be "affected" by this action. In some embodiments, the bounding rectangle can span the "affected" viz and along the shortest perpendicular edge(s) intersected by the active edge.

In some embodiments, dragging an edge can re-size everything that is on both sides of the edge and is inside of or intersects the imaginary bounding box as previously defined. In some embodiments, dragging an intersection can move all edges connecting to the intersection. In certain embodiments, when a visualization is focused, the edges of that viz can define the draggable edges. When no viz is focused, the draggable edges can span until an intersection where 4 visualizations meet.

Some embodiments may have a set of rules for how to insert new tiles and how to handle moving tiles. In some embodiments, the visual analyzer system can provide several visualizations in a display area of a canvas layout at the same time. The visual analyzer system can receive an indication to add a new visualization to the several visualizations in the display area. The visual analyzer system can determine a portion of the display area that is affected by the received indication to add the new visualization.

The display area can include one or more edges in certain embodiments. In some embodiments, receiving the indication to add the new visualization to the plurality of visualizations includes receiving a reference to a first edge within the display area. The visual analyzer system can determine a second edge in the display area where the second edge is a shortest perpendicular edge of the first edge in the display area. The visual analyzer system can calculate a maximum number of visualizations that are intersected by the second edge. In some embodiments, the visual analyzer system can determine a height for the new visualization based on the calculated number of visualizations. The visual analyzer system can insert the new visualization into the display area, where the new visualization has the determined height.

In this example, each tile displayed on the canvas layout display area can represent a visualization. Embodiments provide techniques for determining how to add a visualization to a canvas layout including one or more tiles representing one or more visualizations. Various embodiments provide techniques for determining how to remove a visualization from a canvas layout. Some embodiments also provide techniques for repositioning and/or resizing a visualization. Certain embodiments provide techniques for swapping positions of visualizations within a canvas layout.

I. System Overview

FIG. 1 illustrates an example block diagram of a system 100 in accordance with certain embodiments of the present invention. As shown, system 100 includes a visual analyzer subsystem 102 communicatively coupled to GUI 104 (e.g., via a network). In this example, visual analyzer subsystem 102 includes multiple components such as, but not limited to, a layout manager 106 that includes a sizing engine 108 and a placement engine 110, memory 114 that includes a set of rules 116, and renderer 116. The embodiment depicted in FIG. 1 is merely an example and is not intended to unduly limit the claimed embodiments of the present invention. One of ordinary skill in the art would recognize many variations, alternatives, and modifications. The various components described in FIG. 1 can be implemented in software, hardware, or a combination thereof.

In some embodiments, visual analyzer subsystem 102 can be a standalone executable application, a portion of an application (e.g., a browser application or a local application), a configuration file to be used with another application, etc. with components distributed across one or more servers or a client device. A visual analyzer application can display one or more visualizations 118 via GUI 104 e.g., on a client device. One or more visual analyzer components such as a data visualization, a toolbox component, a dialogue component, a data elements pane, etc. can be generated by the visual analyzer application and displayed on a device through GUI 104 presented by a web browser or a visual analyzer application. GUI 104 can provide a projection of one or more databases using one or more representations (e.g., tabs, text, menus, business objects, folders). The user can select one or more dimensions of data (also referred to as columns in a database, or business objects) available in the one or more databases using a data service. The application may then generate and display a visualization based on the one or more dimensions of data that the user would like represented through the visualization 118 on GUI 104. As described, an example of a database is a relational database with columns and rows. A dimension of data can correspond to a column in a database while records can correspond to the rows in the database.

In certain embodiments, visual analyzer subsystem 102 includes a layout manager 106 that includes a sizing engine 108 and a placement engine 110, memory 114 that includes a set of rules 116, and renderer 116. In some embodiments, layout manager 106 can determine, based on user input, how to rearrange one or more visualizations being displayed on GUI 104 using a set of rules 114. In certain embodiments, layout manager 106 may reside on one or more servers or a client device. Renderer 116 may render the visualizations on GUI 104. Renderer 116 may also either reside on one or more servers or a client device. A client device may be of various different types, including, but not limited to a personal computer, a desktop, a mobile or handheld device such as a laptop, a mobile phone, a tablet, etc., and other types of devices.

After a set of visualizations 118 have been generated and presented via GUI 104 on the client device, the user can modify a configuration of the visualizations displayed on a GUI 104 of visual analyzer application. The configuration modification can include adding or removing one or more visualizations to or from the set of visualizations. The configuration modification can include swapping locations of visualizations or adjusting a size of one or more visualizations being presented on GUI 104. Upon receiving the indication of a change in the configuration of tiles representing the visualizations, GUI 104 on a client device can convey the change information to visual analyzer subsystem 102 through a communication network.

In some embodiments, a communication network facilitates communications between one or more client devices and visual analyzer subsystem 102. A communication network can be of various types and can include one or more communication networks. For example, a communication network can include, without restriction, the Internet, a wide area network (WAN,), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, a communication network may include any communication network or infrastructure that facilitates communications between one or more client devices and visual analyzer subsystem 102.

As described, the user may modify a configuration of the visualizations displayed on GUI 104 by interacting with one or more visualizations current displayed on GUI 104. For instance, the user may remove a visualization by selecting a visualization and deleting the visualization, thereby causing the surrounding visualizations to adjust their sizes and positions to fill the void created by the removal. In another instance, the user may insert a visualization into a current arrangement of visualizations being displayed on GUI 104 by dragging and dropping one or more dimensions from a data elements pane into an area within the canvas layout (e.g., an edge of a visualization). These modifications to the arrangement of visualizations in a canvas layout can be characterized as a mod event in some embodiments.

Upon receiving the mod event, layout manager 106 may determine a change in size and a placement of one or more visualizations. As shown, layout manager 106 may include a sizing engine 108 and a placement engine 110. Sizing engine 108 can determine the various dimensions of the existing visualizations and any changes to a visualization identified by the mod event. For example, one or more dimensions of existing visualizations may be modified due to the mod event where a user may have specified to insert a visualization, remove a visualization, etc. Inserting a visualization may cause one or more existing visualization to shrink in size to accommodate the new visualization while removing a visualization may cause one or more existing visualizations to increase in size to fill the gap once the visualization is removed. In some embodiments, the dimensions of the various visualizations may be determined based on a set of rules 114 stored in memory 112.

Placement engine 110 can determine the position (e.g., coordinates within the layout) of the various visualizations and the visualization identified by the mod event. For example, placement engine 110 can determine how to place an inserted visualization and how to adjust the placements of other visualizations that were pre-existing in the canvas layout. Placement engine 110 can also determine how to adjust the placements of the existing visualizations when the user desires to remove a visualization from the existing visualizations in a canvas layout. Upon receiving other types of modifications to the layout, placement engine 110 can determine how to move the visualizations around to accommodate the desired modification.

In some embodiments, upon receiving the mod event, layout manager 106 can determine whether the user would like to add a visualization, remove a visualization, swap or reposition locations of visualizations, or resize certain visualizations. Placement engine 110 may determine an edge corresponding to the mod event. Different embodiments may determine an edge corresponding to a mod event depending on the type of mod event. In some embodiments, placement engine 110 may determine the edge corresponding to the mod event based on a set of rules such as rules 114. For example, for a mod event that is a removal of a presently existing visualization, the edge corresponding to the event may be an edge of the presently existing visualization to be removed where the edge only shares unit edges with one or more of the other presently existing visualizations. In certain embodiments, the mod event may include a specification of one or more edges that correspond to the event. For example, for a mod event that is an insertion of a new visualization into the current layout, the user may have specified an edge of a pre-existing visualization into which to insert the new visualization. In such an example, the specified edge may be the edge corresponding to the event.

In response to placement engine 110 determining an edge corresponding to the mod event, layout manager 106 may determine a region within the canvas layout that may be affected by the mod event. In some embodiments, layout manager 106 determines a box based on the edge, where the box encloses a portion of the display area that is less than the full display area in the canvas layout. The box may enclose one or more visualizations within the canvas layout to which adjustments may be made in order to accommodate the mod event. In some embodiments, the box may be determined based on the type of mod event. The determination may be made based on a set of rules 114 in some embodiments. In certain embodiments, the box identifying the affected portion of the display area (also referred to as affected subsection, affected region, or insertion box throughout this disclosure) within the display area can be determined by determining a shortest perpendicular edge to the edge corresponding to the mod event and then determining the region encompassed by the edge corresponding to the mod event and the shortest perpendicular edge.

After the affected region (e.g., enclosed by a box) has been identified, sizing engine 108 can determine how to resize one or more visualizations (e.g., the new visualization and the pre-existing visualizations) within the box. In some embodiments, sizing engine can calculate a maximum number of visualizations that are intersected by a perpendicular line to the edge corresponding to the mod event. Sizing engine 108 can then compute the size of the various visualizations within the affected region based on the calculated number of intersected visualizations. Different embodiments may size the visualizations differently. Depending on a set of rules specified by rules 114, sizing engine 108 may resize different visualizations differently. For example, sizing engine 108 may determine not to resize certain visualizations (e.g., based on visualization type and/or other parameters). Upon determining the sizes of the visualizations within the affected region, sizing engine 108 can send the new dimension information to renderer 116. Renderer 116 can then render the new GUI 104 including the modified layout that has incorporated the modifications from the mod event and the updated dimensions of various visualizations.

II. Flow Overview

Figure 2:
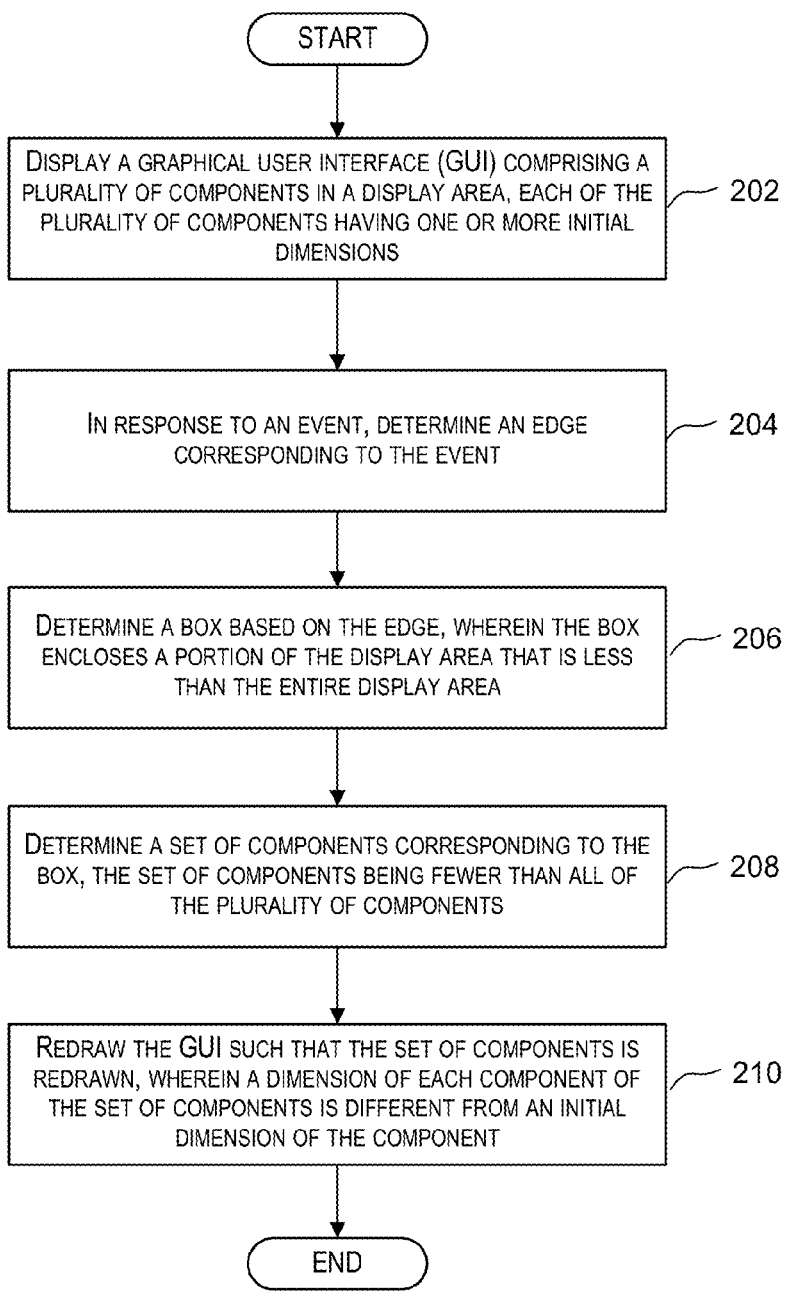
FIG. 2 illustrates an example process of re according to some embodiments of the present invention.

FIG. 2 illustrates an example process 200 of re according to some embodiments of the present invention. Some embodiments can facilitate interactivity with an arrangement of one or more visualizations within a canvas layout while ensuring that the change in the overall presentation is pleasing and non-intrusive to a user. Process 200 can be performed by a single device (e.g., system 100 in FIG. 1) including a client device or a server device or any suitable combination of devices.

At block 202, process 200 can display a GUI including several components in a display area, each of the several components having one or more initial dimensions. In some embodiments, the GUI can be displayed via a web browser or a visual analyzer application running on a client device. The GUI can display multiple visual analyzer components such as a data elements pane that includes elements representing various dimensions, a canvas layout that can display one or more visualizations, one or more tools of the visual analyzer application, etc. The canvas layout of the GUI can display multiple components such as data visualizations in its display area. Each data visualization may have a size and a position within the canvas layout. The size of a data visualization can be identified by its one or more dimensions (e.g., a width and a length).

At block 204, process 200 can, in response to an event, determine an edge corresponding to the event. In some embodiments, the event can be a mod event where a modification is made to the layout. In certain embodiments, the mod event can be an insertion of a visualization, a deletion of a visualization, a repositioning of a visualization, or a resizing of a visualization, etc.

In some embodiments, the edge corresponding to the event can be determined based on a position of a cursor in the canvas layout. For example, an edge corresponding to a visualization insertion event can be the edge at which a user has dropped the icon representing the visualization that the user would like to insert. The edge can be a unit edge or a full edge. The edge may also be an edge of a layout container, an edge of a visualization, or a shared edge between visualizations. In some embodiments, when the cursor is just inside a viz, the unit edge closest to the viz side is used. In certain embodiments, when the cursor is over an edge gap, a full edge is used for the insertion bar (also referred to as the edge specified by the user or the edge corresponding to the event).

At block 206, process 200 can determine a box (also referred to as bounding box, insertion box, or rectangle throughout this disclosure) based on the edge, the box enclosing a portion of the display area that is less than the entire display area. Some embodiments may determine a box (e.g., a rectangle with four edges) based on the edge. Depending on the type of event, the box may be determined differently.

At block 208, process 200 can determine a set of components corresponding to the box, the set of components being fewer than all of the components. In some embodiments, the box identifies the set components that are affected by the mod event.

At block 210, process 200 can redraw the GUI such that the set of components is redrawn. In some embodiments, a dimension of each component of the set of components can be different from an initial dimension of the component. In some embodiments, the components are redrawn to accommodate the mod event that is either an insertion, a removal, or another type of modification to one or more visualizations in the canvas layout. In certain embodiments, the "affected" components may be redrawn such that their dimensions are different from what they were before the mod event. In some embodiments, only one dimension of each component may be altered. For example, the width may be reduced or increased while a length may remain the same. As such, the area covered by the visualization (also referred to as a visual analyzer component) in the GUI may be different from the initial area that the visualization was occupying before the mod event occurred.

Some or all of the process 200 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program to be executed by processing unit(s), such as a browser application. The computer-readable storage medium may be non-transitory.

III. Example Flow for Inserting a New Visualization

Figure 3:
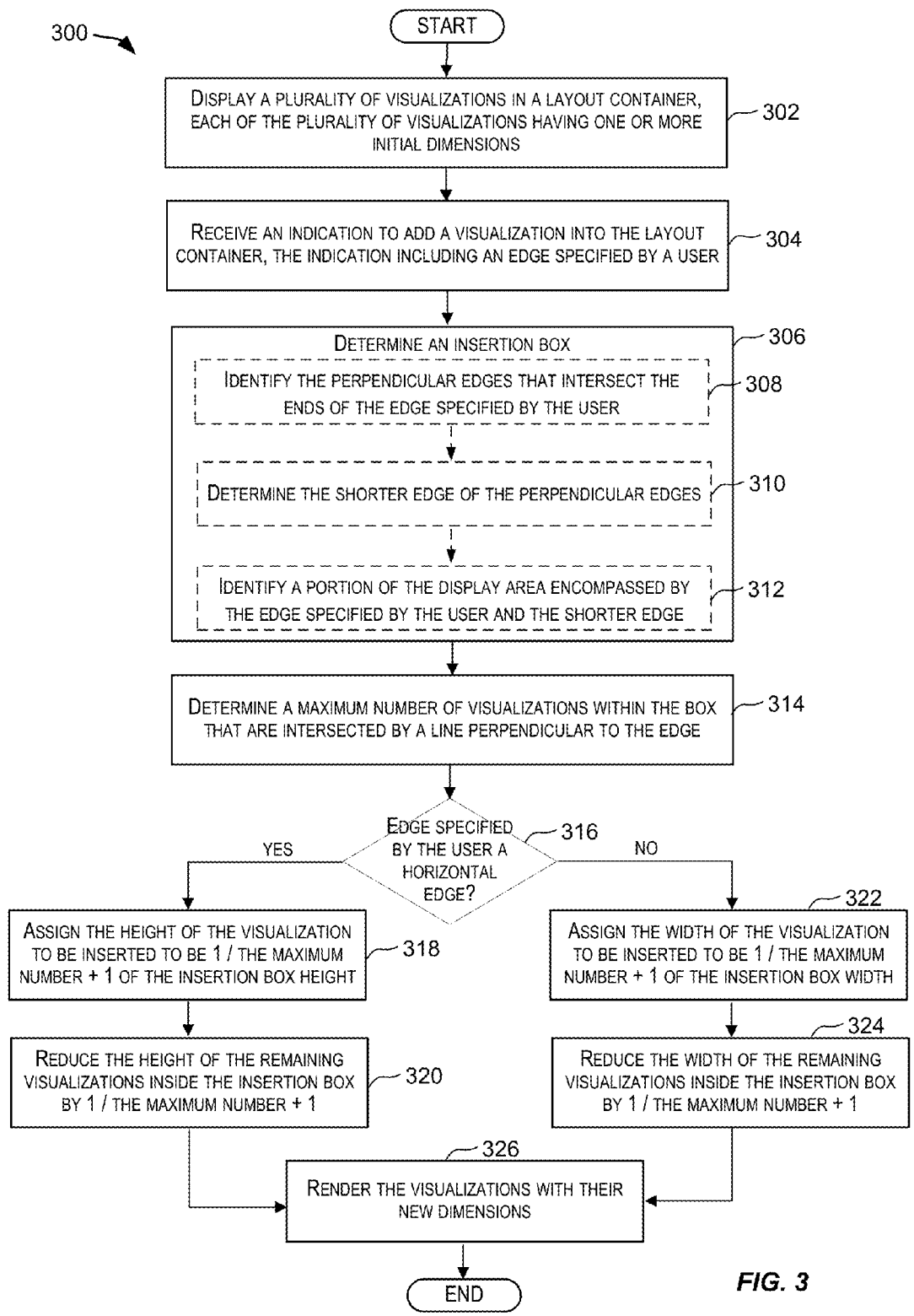
FIG. 3 illustrates an example process for generating an updated layout of visualizations upon an insertion of a new visualization in accordance with some embodiments of the present invention.

FIG. 3 illustrates an example process 300 for generating an updated layout of visualizations upon an insertion of a new visualization in accordance with some embodiments of the present invention. In some embodiments, process 300 can be performed by one or more computing devices including a client device and/or one or more server computing devices. Process 300 will be described by reference to FIGS. 4A-4D, which illustrate an example sequence in determining how to adjust a dimension of one or more components in a display area to accommodate a new component.

At block 302, process 300 can display a number of visualizations in a layout container. Each of the number of visualizations can have one or more initial dimensions. In some embodiments, the layout container can include a display area that is a rectangular display area and the number of visualizations may occupy the full display area. Each of the visualizations may have a rectangular shape occupying a portion of the display area.

At block 304, process 300 can receive an indication to add a visualization into the layout container. The indication can include an edge specified by the user. In some embodiments, an indication to add a visualization can be received when a user has selected one or more dimensions of data (e.g., from a data elements pane of the visual analyzer application). In certain embodiments, the user may drag an icon representing a data visualization representing the one or more dimensions of data and drop the icon into a particular region within the canvas layout. The particular region may be an edge of a visualization, an edge of the layout container, or a shared edge between visualizations.

Some embodiments can determine the edge based on a position of the cursor. The edge can be of a certain length and in a certain position within the canvas layout. For example, the edge can be a unit edge, which spans the length of a single visualization and where the length is less than the length of the canvas layout. The edge can be a full edge in some instances, which would span the length of the canvas layout visualizations. The full edge may span across multiple visualizations. The edge may be a full edge or a unit edge depending on where the cursor is hovering over within the canvas layout. In some embodiments, the user may specify whether the user desires to insert the component at a unit edge or a full edge by adjusting the cursor and determining which edges (e.g., full length or unit length of which visualizations) are being highlighted. Different embodiments may show an indication as to where the insertion of the component may be differently. For example, instead of highlighting an edge, some embodiments may display the edge as flashing or in a different color when it appears that the user may be selecting the edge.

Figure 4B:
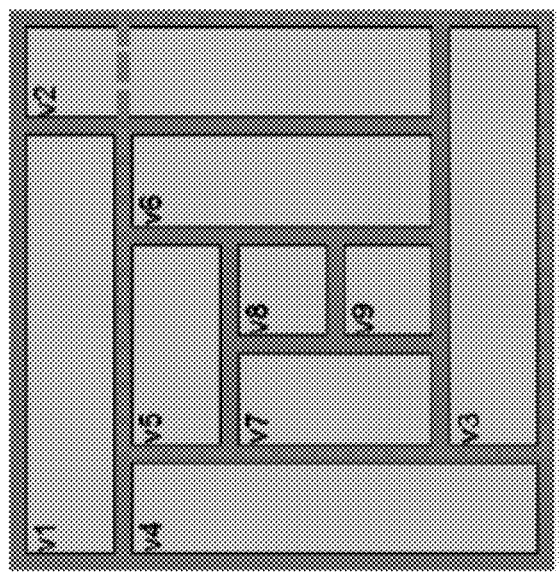
FIGS. 4A-4D shows a sequence of how a new visualization may be inserted into a split layout of visualizations in accordance with some embodiments of the present invention.
Figure 4A:
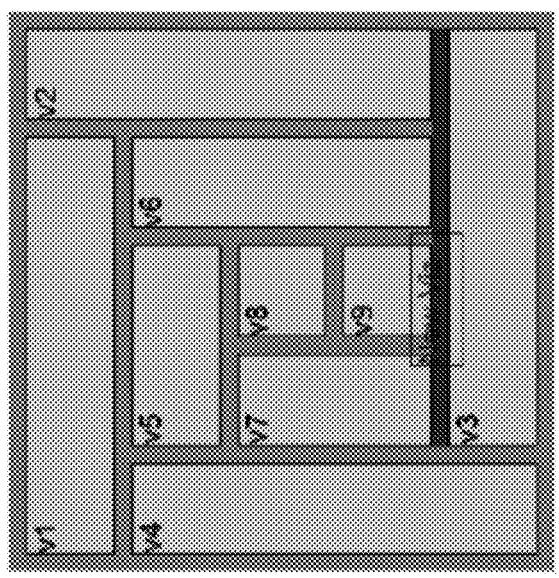

In certain embodiments, the selected edge may be visually shown to the user and the user may have the ability to move the cursor to control the length of the edge. As shown in FIG. 4A, a new viz icon may be seen hovering over a highlighted edge that is between visualizations v3 and v7, v9, v6, and v2, indicating that the user the user's cursor is hovering over the highlighted unit edge. In this example, the indication to add a visualization is received when the user hovers and then drops the icon representing a new viz onto the highlighted edge.

At block 306, process 300 can determine an insertion box. In some embodiments, the insertion box can identify a portion of a display area (and hence, the visualizations within that portion of the display area) that is affected by the received indication to add the new visualization. The insertion box may identify a portion of the display area that is less than the entire display area of the canvas layout. As shown in FIG. 4B, an insertion box has been identified and highlighted by the dotted lines (which may or may not be shown to the user). Different embodiments may determine the insertion box differently. In some embodiments, the visualizations enclosed (or partially enclosed) by the insertion box may be adjusted in size (e.g., scaled proportionally) to enable the newly inserted visualization to fit into the desired location.

In some embodiments, block 306 can include identifying, at block 308, the perpendicular edges that intersect the ends of the edge specified by the user. To determine the insertion box, some embodiments may identify the two ends of the edge specified by the user and the edges that are perpendicular to the edge identified by the user and that intersect an end of the edge specified by the user. In the example in FIG. 4B, the perpendicular edges that intersect the edges of the edge specified by the user (i.e., the upper edge of v3) would be the right edge of v4 and the right full edge of the canvas layout.

In certain embodiments, block 306 may include determining, at block 310, the shorter edge of the perpendicular edges. Some embodiments may determine which of the two perpendicular edges is the shorter edge in this algorithm. In the example in FIG. 4B, the shorter of the two perpendicular edges intersecting the ends of the edge specified by the user (where the edge specified by the user is the upper edge of v3) is the right edge of v4.

In some embodiments, block 306 can include identifying, at block 312, a portion of the display area encompassed by the edge specified by the user and the shorter edge. Using the shorter edge and the edge specified by the user, some embodiments may determine the box (or the portion of the display area) by determining the minimum rectangular shape needed to enclose both the edges. The two edges can define the rectangular box that enclose both the edges. As shown in FIG. 4B, the minimum rectangular box that encloses both the right edge of v4 and the upper edge of v3 can be shown by the dotted box.

Figure 4D:
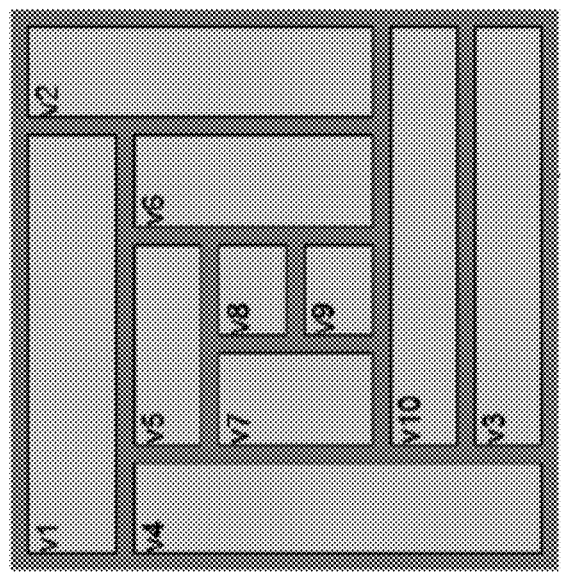
Figure 4C:
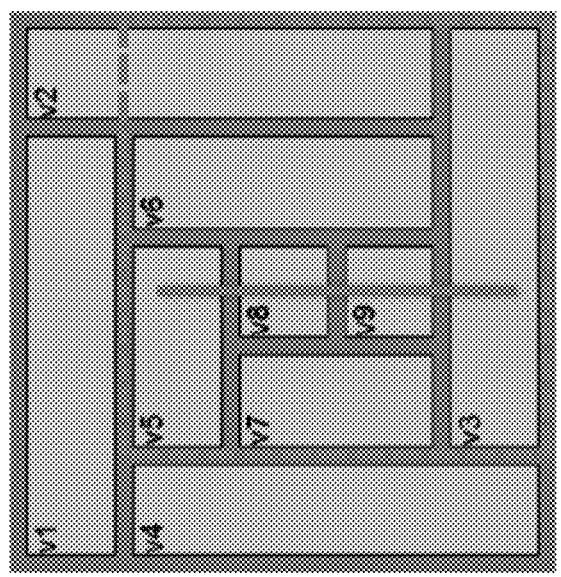

At block 314, process 300 can determine a maximum number of visualizations within the box that are intersected by a line perpendicular to the edge. Some embodiments may determine a line perpendicular to the edge specified by the user and determine a maximum number of visualizations within the box that intersect the perpendicular line. As shown in FIG. 4C, a line perpendicular to v3's upper edge is indicated by the solid line, which may not be shown to a user. The maximum number of visualizations within the box that intersect the perpendicular line is 4 in this example. The intersecting visualizations are v5, v8, v9, and v3.

Different embodiments may make this determination differently. Some embodiments may determine that the insertion edge is a horizontal edge and therefore a vertical space needs to be adjusted. To scale the height of visualizations, a maximum number of visualizations that are stacked vertically may need to be determined. In this example, the most visualizations that are placed vertically are along the solid line identified in FIG. 4C. A total of 4 visualizations may be identified. Instead of identifying the number of maximum visualizations along a perpendicular dimension, some embodiments may determine the visualization with the shortest length (height in this instance but can be the width if the insertion edge was a vertical edge) and divide the total length of the box (total height of the box in this instance) by the shortest length. Using this method, the result would be the same here.

At block 316, process 300 can determine whether an edge specified by the user is a horizontal edge. Some embodiments may determine whether the edge is a horizontal edge or a vertical edge to determine the adjustments that need to be made to the various components in the display area to accommodate the newly inserted component. To determine the scaling of the affected visualizations in order to fit in the newly inserted visualization, some embodiments may determine that height adjustments would need to be made to the visualizations since the edge specified by the user is a horizontal edge. In the example for FIG. 4, the edge specified by the user is the horizontal upper edge of v3 (or the horizontal edge that is between v3 and v7, v9, v6, and v2), therefore, one dimension of the edge to be inserted (i.e., the width in this example) has already been determined.

At block 318, upon determining that the edge is a horizontal edge, process 300 can assign the height of the visualization to be inserted to be 1/(the maximum number+1) of the insertion box height. Some embodiments may determine the other dimension of the edge of the visualization to be inserted (i.e., the height in this example) by adding 1 to the number (e.g., maximum number of vertical visualizations) determined at block 314, which is 5 in this example. Some embodiments may determine the insertion box height. The other dimension of the edge of the visualization to be inserted may be to be 1/(the maximum number+1) of the insertion box height, which is ⅕ of the insertion box height in this example. As shown in FIG. 4D, the height of the inserted visualization v10 is ⅕ of the insertion box height.

At block 320, process 300 can reduce the height of the remaining visualizations inside the insertion box by 1/(the maximum number+1). The other visualizations in the insertion box may also need to scale at least one dimension (in this example, the height) to accommodate the new visualization. Some embodiments may scale back the height of the pre-existing visualizations proportionally by the height of the inserted visualization. In this example, the height of the pre-existing visualizations inside the insertion box may be reduced by ⅕ of the insertion box height. In this example, to find the new dimension (i.e., height in this example) for the pre-existing visualizations, some embodiments may multiple the height of each of the visualizations by ⅘, which would be the same as reducing the height by ⅕. As shown in FIG. 4D, the height of the various pre-existing visualizations have been reduced and scaled down by ⅕ of their initial heights. The height dimension of these pre-existing visualizations may be reduce proportionally to the proportion of the height of the insertion box now occupied by the newly inserted visualization.

At block 322, upon determining that the edge is a not a horizontal edge but is a vertical edge, process 300 can assign the width of the visualization to be inserted to be 1/(the maximum number+1) of the insertion box width. If the edge specified by the user is not a horizontal edge but a vertical edge in the canvas layout, then some embodiments may determine the width of the visualization to be inserted, since the height would be the same as the edge specified by the user. Some embodiments may determine the maximum number of visualizations along a width of the insertion box (or along a horizontal line perpendicular to the vertical edge) from block 314 and add 1. As described above, instead of determining the maximum number of visualizations along the width of the insertion box, some embodiments may determine the visualization with the smallest width and divide the insertion box width by the smallest width. In some embodiments, the width of the visualization to be inserted may then be 1/(the maximum number+1) of the insertion box width.

At block 324, process 300 can reduce the width of the remaining visualizations inside the insertion box by 1/(the maximum number+1). Some embodiments may scale back the width of the various visualization proportionally by 1/(the maximum number+1). The width dimension of these pre-existing visualizations may be reduce proportionally to the proportion of the width of the insertion box now occupied by the newly inserted visualization.

At block 326, process 300 can render the visualizations with their new dimensions. The sizes of various components are modified to accommodate the new component. In some embodiments, the number of components being modified is less than all of the components in the display area. Instead of having to readjust all of the visualizations within the canvas layout to accommodate the newly inserted visualization or adjusting only those visualizations adjust to the region in which the newly inserted component is to be inserted, embodiments can identify a minimized number of components that need to be affected that is less the full number of pre-existing components and modify only those identified components. Embodiments may identify the minimized number of components while ensuring that the components look proportional to a user after the visualization has been inserted.

As described, all the components in the identified box may be scaled proportionally (e.g., increased or decreased in size at a same percentage) according to a determined height or a width for the newly inserted visualization. By scaling a dimension of all the components in the identified box that is less than all the components being displayed in the canvas layout, a minimum number of visualizations are scaled while preserving the look and behavior of the overall presentation of visualizations to a user. By determining the minimum number of visualizations that need to be affected (e.g., using a box) where the affected visualizations are not only those visualizations immediately adjoining the visualization to be inserted (or removed, etc.), embodiments may reduce processing power while ensuring that the GUI reacts the way that the user desires or anticipates.

IV. Rules for a New Visualization and for Resizing Existing Visualizations

Some embodiments may provide a set of rules for a new visualization to be inserted into a region of the canvas layout. In certain embodiments, the new visualization may have a fixed dimension and a shared dimension. The fixed dimension may correspond to the axis shared with insertion bar. For example, if the insertion bar is vertical, the new visualization will have the same height as the insertion bar. The shared dimension may correspond to the axis running perpendicular to the insertion bar. For example, if the insertion bar is vertical, the new visualization will have to split the width value. In some embodiments, the shared dimension value is determined by finding n, which is the maximum number of visualizations that are intersected by a perpendicular line. Some embodiments may then assign the new visualization $1/(n+1)$ of available space. Certain embodiments may assign the other visualizations $n/(n+1)$ of available space.

Figure 5B:
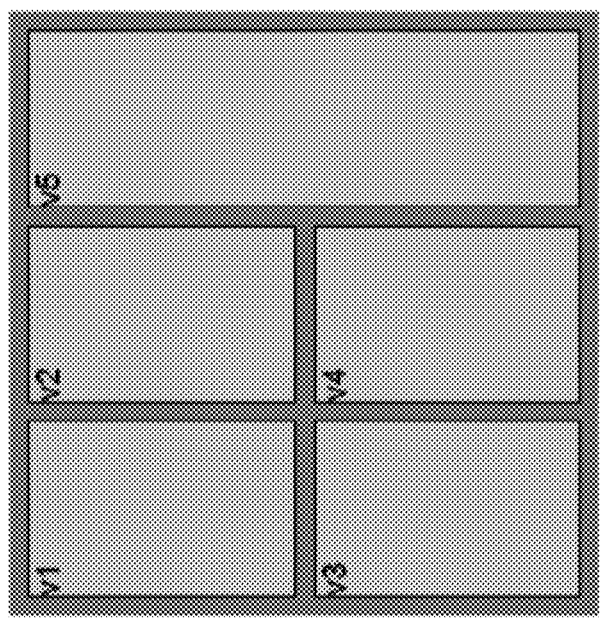
FIGS. 5A and 5B illustrate the adjustment of visualizations upon insertion of a new visualization into an edge of a layout container in accordance with some embodiments.
Figure 5A:
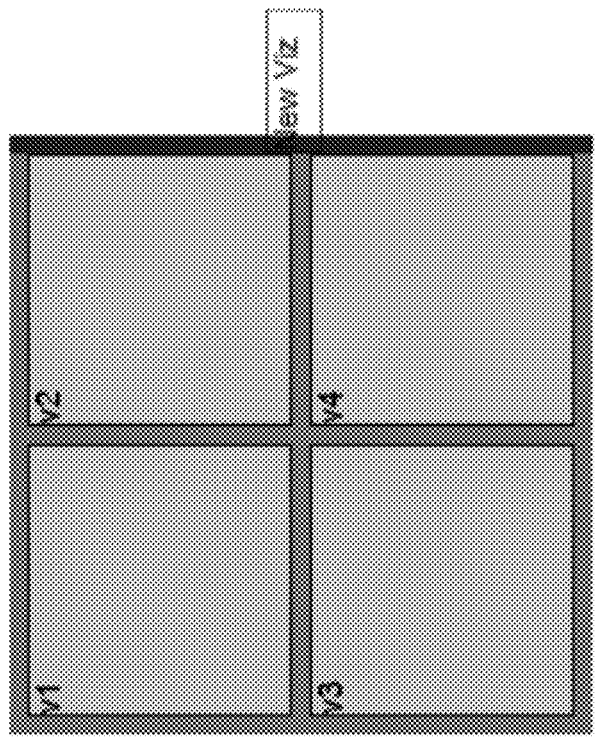

As described, a visualization can be added to three different regions of a layout container: an edge of a layout container, an edge of a visualization, or a shared edge between visualizations. A set of rules (such as rules 114 from FIG. 1) may indicate how to determine a fixed dimension and a shared dimension of a newly inserted visualization based on the region into which the new visualization is inserted. FIGS. 5A and 5B illustrate the adjustment of visualizations upon insertion of a new visualization into an edge of a layout container in accordance with some embodiments. In some embodiments, when inserting a new visualization into an edge of a layout container, the rules can specify that the new visualization can include a fixed dimension and a shared dimension.

In FIG. 5A, a new viz icon is shown to be added to the right edge of the layout container. The edge specified by the user as the region to add the new visualization is highlighted.

The fixed dimension of the new visualization can be the full length of the container side. The shared dimension of the new visualization can use all visualization in the layout when calculating the number of visualizations that intersect with the perpendicular line. In some embodiments, not all of the visualizations in the layout may be scaled to accommodate the insertion of the new visualization. Embodiments may determine the minimum number of visualizations "affected" or needed to be adjusted to minimize the processing power and time needed to accommodate the new visualization while ensuring that the display of the various visualizations look proportional and intuitive to a user. In certain embodiments, the minimum number of visualizations that need to be adjusted may be fewer than the total number of visualizations in the canvas layout or may be all of the visualizations in the canvas layout.

In this example, a new viz v5 is added to the right side of the layout container. Some embodiments determine the maximum number of visualizations intersected by a horizontal line, which is 2. V5.width can be the layout container width/3 and V5.height can be the layout container height, according to the rules specified for inserting a new visualization into an edge of a layout container. Upon determining the dimensions of the new visualization and the dimensions of the pre-existing visualizations, a new GUI including all of the modified visualizations may be rendered and displayed to the user of the visual analyzer application, as shown in FIG. 5B.

Figure 6B:
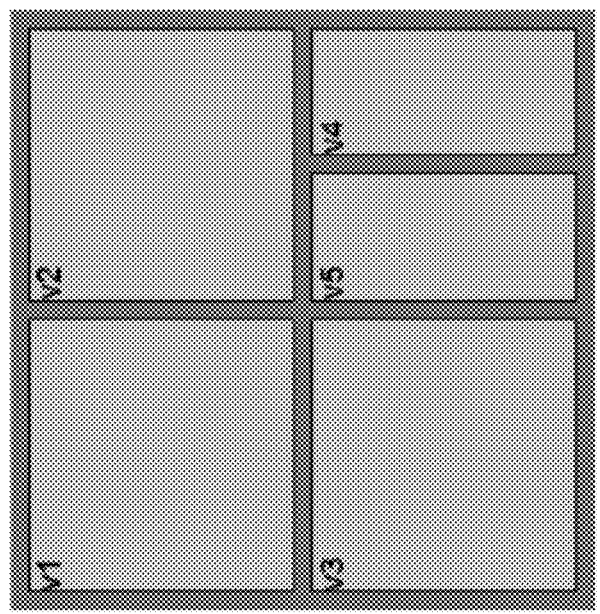
FIGS. 6A and 6B illustrate the adjustment of visualizations upon insertion of a new visualization into an edge of a visualization in accordance with some embodiments.
Figure 6A:
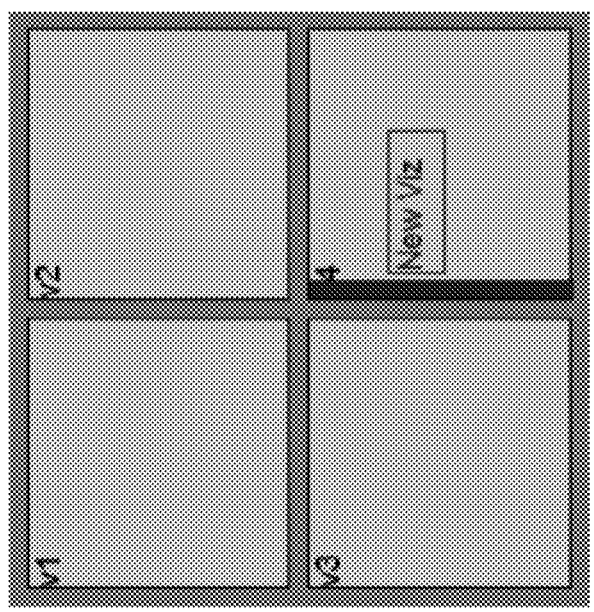

Some embodiments may add a new visualization to an edge of a visualization. FIGS. 6A and 6B illustrate the adjustment of visualizations upon insertion of a new visualization into an edge of a visualization in accordance with some embodiments. In some embodiments, when inserting a new visualization into an edge of a visualization, the rules can specify that the new visualization can include a fixed dimension and a shared dimension.

In FIG. 6A, a new viz icon is shown to be added to the left edge of a visualization V4. The edge specified by the user as the region to add the new visualization is highlighted. The fixed dimension of the new visualization can be the full length of the visualization side. The shared dimension of the new visualization can be determined by splitting the existing visualization dimension in half.

As shown in FIG. 6B, a new viz V5 is added to the left side of the viz V4. Some embodiments determine the maximum number of visualizations intersected by a horizontal line, which is 1 in this instance. V5.width can be V4.width/2 and V5.height can be V4.height, according to the rules specified for inserting a new visualization into an edge of a visualization. Upon determining the dimensions of the new visualization and the dimensions of the pre-existing visualizations, a new GUI including all of the modified visualizations may be rendered and displayed to the user of the visual analyzer application, as shown in FIG. 6B.

Figure 7B:
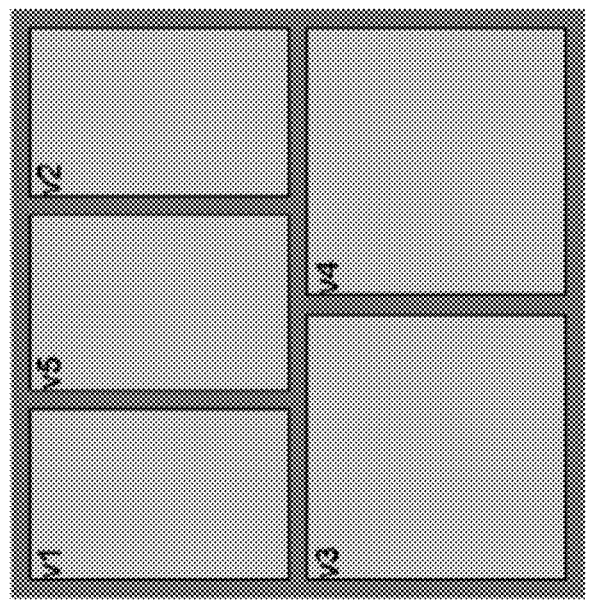
FIGS. 7A and 7B illustrate the adjustment of visualizations upon insertion of a new visualization into a shared edge in accordance with some embodiments.
Figure 7A:
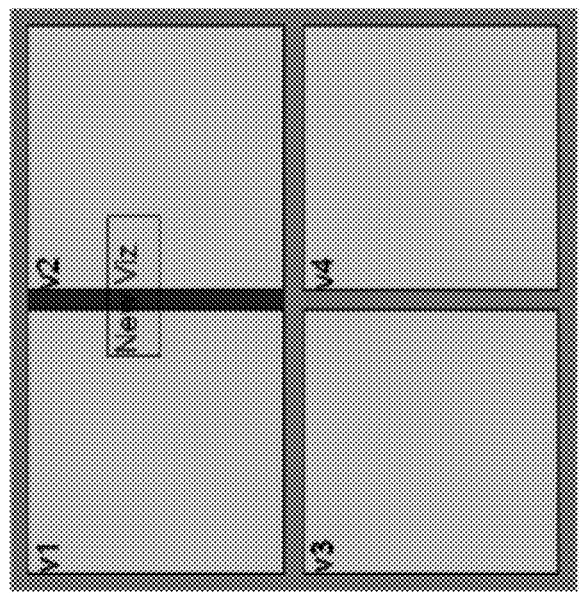

Some embodiments may add a new visualization to a shared edge of visualizations. FIGS. 7A and 7B illustrate the adjustment of visualizations upon insertion of a new visualization into a shared edge in accordance with some embodiments. When inserting a new visualization into a shared edge, some embodiments may determine a fixed dimension and a shared dimension of the new visualization based on a set of rules (e.g., rules 114 from FIG. 1).

In FIG. 7A, a new viz icon is shown to be added to the shared edge of visualizations V1 and V2. The edge specified by the user as the region to add the new visualization is highlighted. The fixed dimension of the new visualization can be the full length of the edge. The shared dimension of the new visualization can be determined by finding the shortest perpendicular edge(s) intersected by the insertion edge, using the perpendicular edge(s) and the insertion edge to create a box, and using all views (also referred to as visualizations and vizs) that intersect insertion box in the perpendicular intersection calculation.

As shown in FIG. 7B, a new viz V5 is added to the vertical edge separating viz V1 and viz V2. Some embodiments determine the maximum number of visualizations intersected by a horizontal line, which is 2 in this instance. The horizontal edge separating V1 and V2 from V3 and V4 are used to form the insertion box. The affected views in this instance are V1 and V2. V5.width can be (V1.width+V2.width)/3 and V5.height can be the insertion bar height, according to the rules specified for inserting a new visualization into a shared edge. Upon determining the dimensions of the new visualization and the dimensions of the pre-existing visualizations, a new GUI including all of the modified visualizations may be rendered and displayed to the user of the visual analyzer application, as shown in FIG. 7B.

Some embodiments include a set of rules for resizing existing visualizations when inserting a new visualization. Certain embodiments can determine a rule for figuring out what existing visualizations should be affected. In some embodiments, the resizing should be done for all visualizations that are within a bounded by a) the line indicating the insertion position (e.g., the blue line), and b) the shortest of the edges perpendicular to the insertion line connected to one of the ends of the insertion line. In this calculation, the edges are spanning as long as possible giving a total of 8 edges in the example.

The new visualization can be given $1/(n+1)$ share of the box from 1 where n is the number of existing visualizations touching the inside of the edges of the box that are perpendicular to the insertion line. A few examples can be illustrated using FIG. 8A:

1. Insert V6 at bottom of Viz1=>Only Viz1 affected and split in half
2. Insert V6 at bottom of Viz2=>Viz2, Viz3 and Viz4 affected, V6 will get height of ⅓ of total height
3. Insert in between V3 and V4=>V3 a and V4 affected, V6 will get width of (V3+V4)/3
4. Insert along any of the vertical lines from top to bottom=>all Viz affected, width of V6=(V1+V2+V5)/4

Figure 8B:
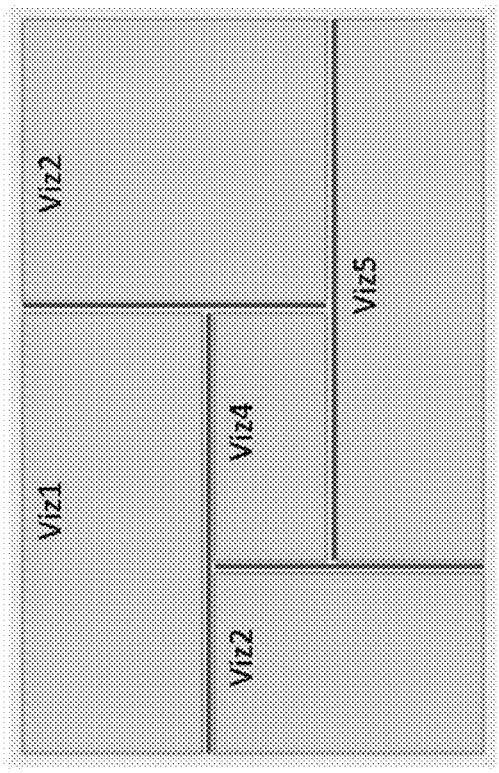
FIGS. 8A and 8B illustrate additional examples of determining affected visualizations and intelligently resizing them to accommodate a new visualization.
Figure 8A:
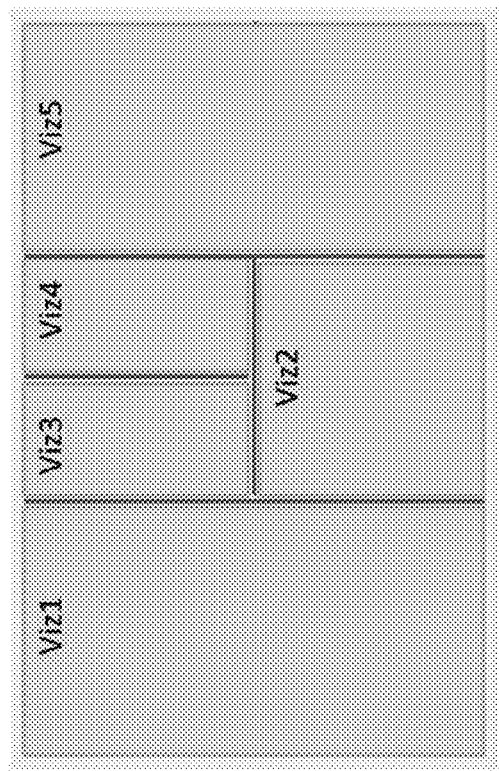

Another few examples can be illustrated using FIG. 8B:
1. Insert on top of V2L (that is V2 on the left)=>only V2L affected and V6 will get half space
2. Insert at bottom of V1=>box intersects V1, V2L and V4, shortest edge is Top to V5, Height of V6 will be (V1+V4)/3

Some embodiments may enable resizing of the different visualizations within the layout. One rule can be that only visualizations attached to the edge being dragged should be affected. In one embodiment, when a visualization reaches its minimum size, the edges may not be continually dragged. Some embodiments may start pushing things on the other side of the small visualization. If a corner of a visualization is used for resizing, it may be possible to resize in both X and Y. In some embodiments, a resize operation may enable a user to grab the bottom of V2L above and drag it upwards until V5 has space to expand left.

V. Example Flow for Deleting a Visualization

Figure 9:
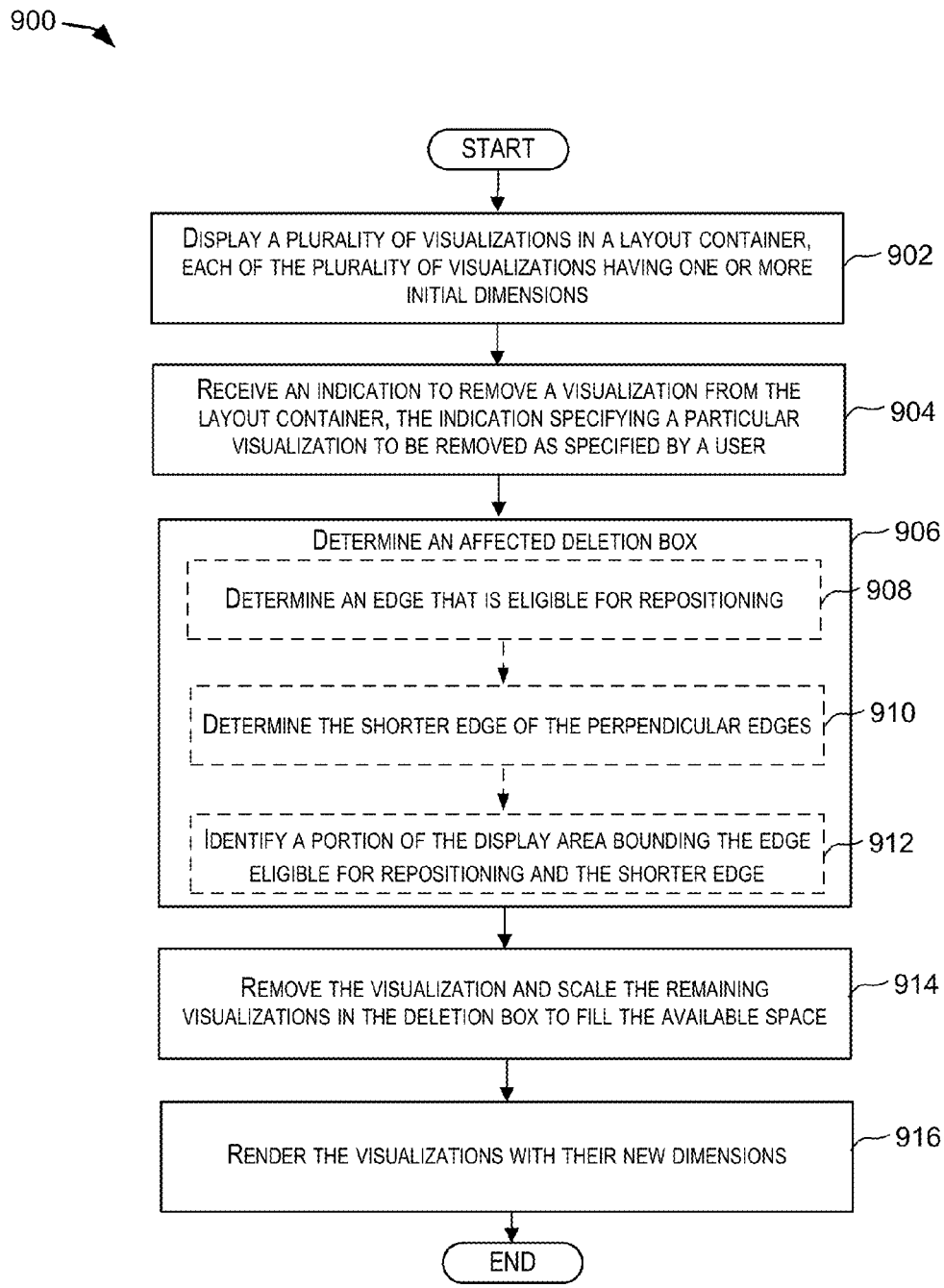
FIG. 9 illustrates an example process for generating an updated layout of visualizations upon a deletion of a visualization in accordance with some embodiments of the present invention.

FIG. 9 illustrates an example process 900 for generating an updated layout of visualizations upon a deletion of a visualization in accordance with some embodiments of the present invention. In some embodiments, process 900 can be performed by one or more computing devices including a client device and/or one or more server computing devices. Process 900 will be described by reference to FIGS. 10A-10D, which illustrate an example sequence in determining how to adjust a dimension of one or more components in a display area to accommodate the deletion of a pre-existing component.

At block 902, process 900 can display a number of visualizations in a layout container. Each of the number of visualizations can have one or more initial dimensions. In some embodiments, the layout container can include a display area that is a rectangular display area and the number of visualizations may occupy the full display area. Each of the visualizations may have a rectangular shape occupying a portion of the display area. As shown in FIG. 10A, there are 9 visualizations currently being displayed in the display area of the canvas layout. Each of the visualizations can have a rectangular shape with 4-edges occupying a portion of the display area.

At block 904, process 900 can receive an indication to delete a visualization from the layout container. The indication can specify a particular visualization to be removed as specified by a user. In some embodiments, an indication to remove a visualization can be received when a user has selected a visualization from the several visualizations being displayed in the canvas layout and hit a delete button. In certain embodiments, an indication to remove a visualization can be received when the user has selected the visualization and dragged it out of the canvas layout. In some embodiments, the user may select to remove multiple visualizations at the same time. In the example shown in FIG. 10, a user has indicated to delete V6.

At block 906, process 900 can determine a deletion box. In some embodiments, the deletion box can identify a portion of a display area (and hence, the visualizations within that portion of the display area) that is affected by the received indication to remove the existing visualization. The deletion box may identify a portion of the display area that is less than the entire display area of the canvas layout. As shown in FIG. 10C, a deletion box has been identified and highlighted by the dotted lines (which may or may not be shown to the user). Different embodiments may determine the insertion box differently. In some embodiments, the visualizations enclosed (or partially enclosed) by the deletion box may be adjusted in size (e.g., scaled proportionally) to fill the available space created by removing the visualization.

In some embodiments, block 906 can include identifying, at block 908, an edge that is eligible for repositioning. To determine one or more edges eligible for repositioning, some embodiments may determine the unit edges for each side of the viz. In some embodiments, for an edge of the viz to be eligible for repositioning, the viz must be the only viz that shares the unit edge's side. Some embodiments may then determine the edges eligible for repositioning by determining whether an edge shares a same side as an edge of another viz.

Figure 10B:
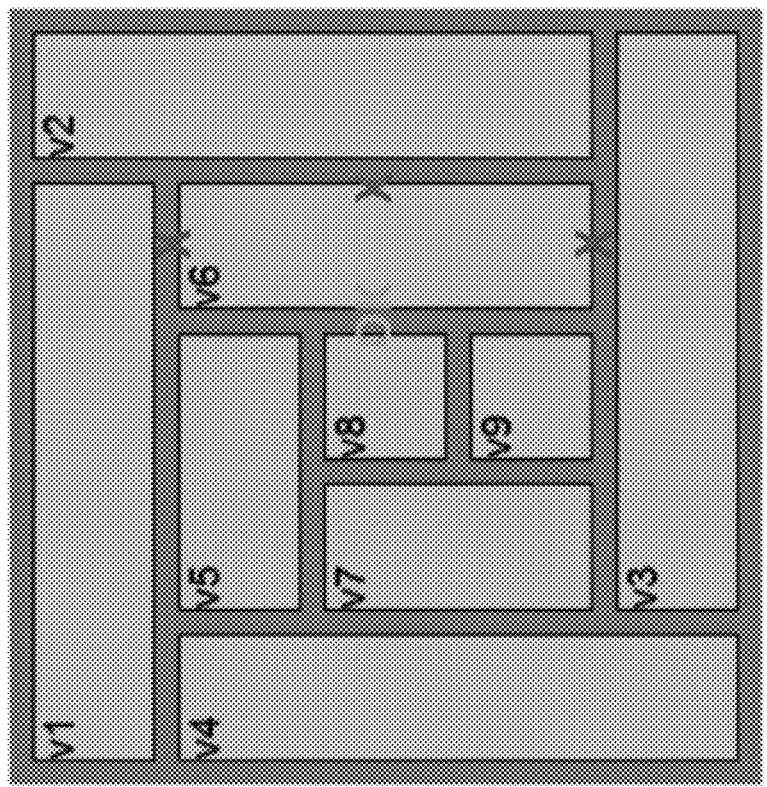
FIGS. 10A-10D illustrate an example sequence in determining how to adjust a dimension of one or more components in a display area to accommodate the deletion of a pre-existing component in accordance with some embodiments of the present invention.
Figure 10A:
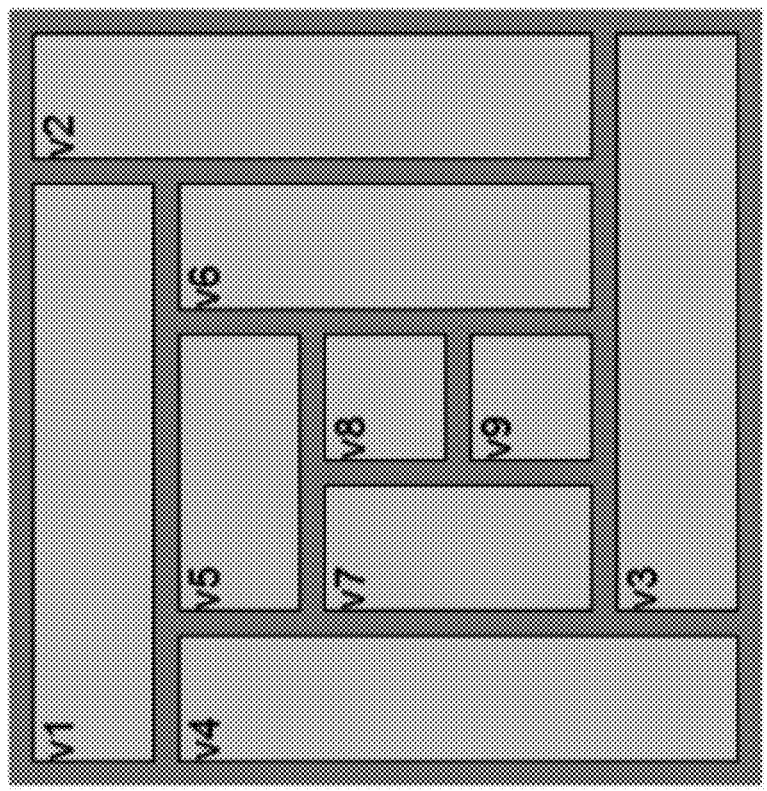

FIG. 10B illustrates an edge that has been identified as being an eligible edge. In this example, the left edge may be eligible for repositioning as the viz V6 is the only viz that shares the unit edge's side. The right side is not eligible because V1 shares the same side of V6's right edge. The top edge is not eligible because V4 and V5 share the same side as V6's top edge. The bottom edge is not eligible because V7, V9, and V2 share the same side of V6's bottom edge.

If there are multiple edges eligible for repositioning, some embodiments may pick an edge to move. In some embodiments, the edge preference may be left, right, top, and bottom. If left and right or top and bottom are both eligible, some embodiments may move both edges. Certain embodiments may avoid moving both left+right and top+bottom. Some embodiments may collapse one set of dimensions. In the example in FIG. 10, the only eligible edge is the left edge. The edge that has been identified to be moved is the left edge of V6 in this instance. As indicated above, the right edge cannot be moved because it shares an edge with V1, which prevents V2 from filling V6's space.

In certain embodiments, block 906 may include determining, at block 910, the shorter edge of the perpendicular edges. Some embodiments may determine the shortest edge (full) that is perpendicular to the eligible deletion side (also referred to as edge). In the example in FIG. 10C, the perpendicular edges may be identified by the highlighted horizontal lines. Some embodiments may calculate the shortest edge distance for example using viz left edge as the max X value for perpendicular edge. In this instance, the bottom perpendicular edge is the shortest edge (or the shorter of the two perpendicular edges intersecting the ends of the edge where the edge is the left edge of V6).

In some embodiments, block 906 can include identifying, at block 912, a portion of the display area encompassed by the edge eligible for repositioning and the shorter edge. Using the shorter edge and the edge eligible for repositioning, some embodiments may determine the box (or the portion of the display area) by determining the minimum rectangular shape needed to enclose both the edges. The two edges can define the rectangular box that enclose both the edges. Some embodiments may calculate the deletion box dimension. As shown in FIG. 10C, the deletion box can be shown by the dotted lines. The deletion box can be determined by determining the bounding box of (V5, V7, V8, V9)+the bounding box of V6. The minimum rectangular box that encloses both the left edge of V6 and the bottom perpendicular edge in addition to the V6 display area can be shown by the dotted box.

Figure 10D:
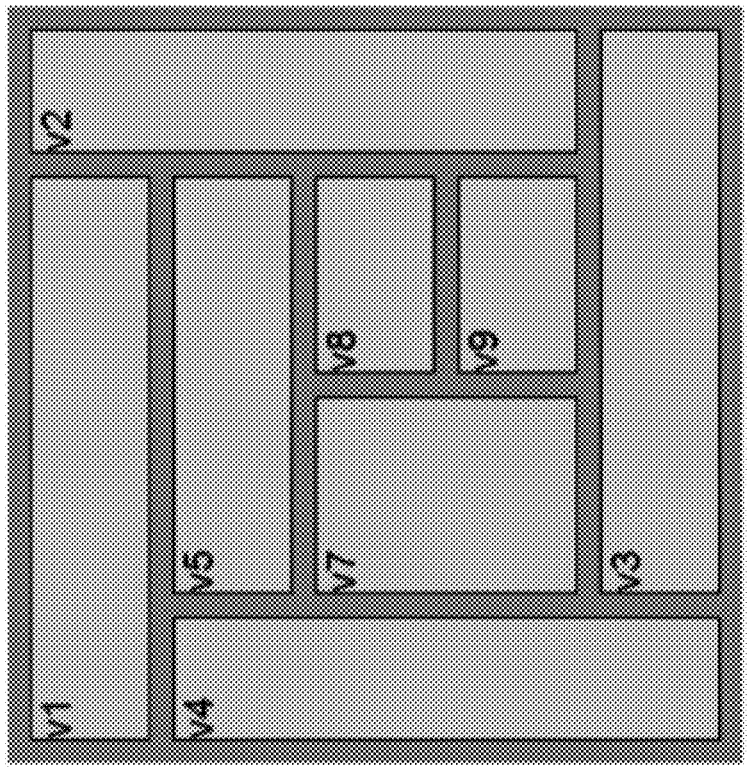
Figure 10C:
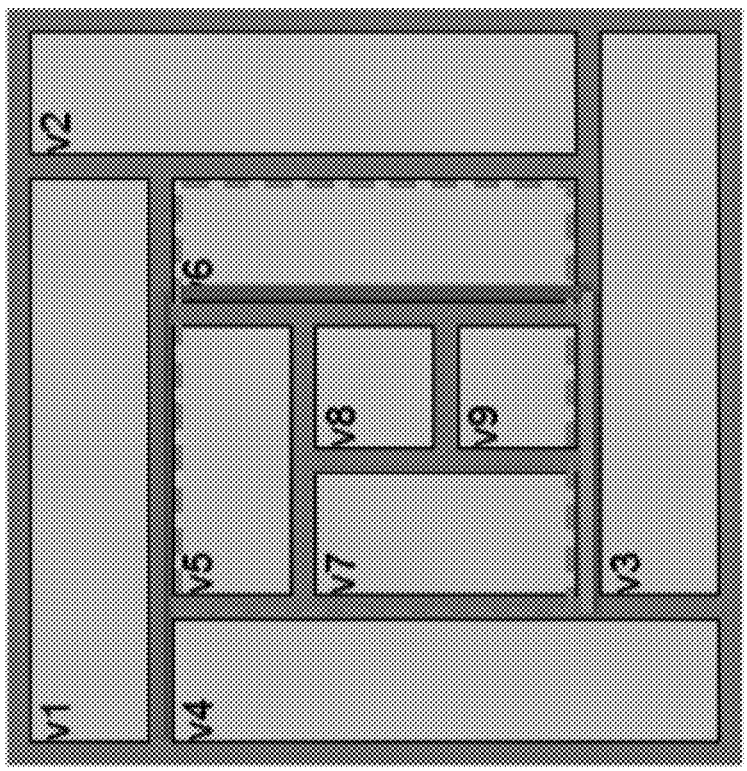

At block 914, process 900 can remove the visualization and scale the remaining visualizations in the deletion box to fill the available space. As shown in FIG. 10D, V6 has been removed and the visualizations in the deletion box (i.e., V5, V7, V8, and V9) have been scaled proportionally to fill the V6's originally occupied space. Different embodiments may scale the remaining visualizations differently. Some embodiments may determine that the available space after V6 is removed is a width that would need to be filled. As such, the proportion of the width of V6 against the width of the box may be the proportion in which the "affected" visualizations would need to increase in proportion. Each of the remaining visualizations may have their widths scaled up proportionally to fill the space previously occupied by V6.

At block 916, process 900 can render the visualizations with their new dimensions. The sizes of various components (or area occupied by each of the affected components) are modified to accommodate the removed component. In some embodiments, the number of components being modified is less than all of the components in the display area. Instead of having to readjust all of the visualizations within the canvas layout to fill the space occupied by a previously existing visualization, embodiments can identify a minimized number of components that need to be affected that is less the full number of pre-existing components less the removed component and modify only those identified components. Embodiments may identify the minimized number of components to reduce processing power and time while ensuring that the components look proportional to a user after the visualization has been removed.

VI. Repositioning a Visualization

Some embodiments may reposition or move a visualization within a canvas layout. In some embodiments, moving a viz can be treated as a combination of "delete viz" and "add viz" operations. When a viz is being repositioned, some embodiments may initially remove the visualization from the current layout in order to properly calculate and display the valid insertion edges. In certain embodiments, an insertion bar may be used to illustrate where the viz will be inserted. Dropping the viz on an insertion bar may result in a similar flow of events described for adding a new viz. In some embodiments, to cancel a repositioning action, a user may move the selected viz to an invalid drop area outside of the container and release the viz. The previous layout may then be restored.

Figure 11B:
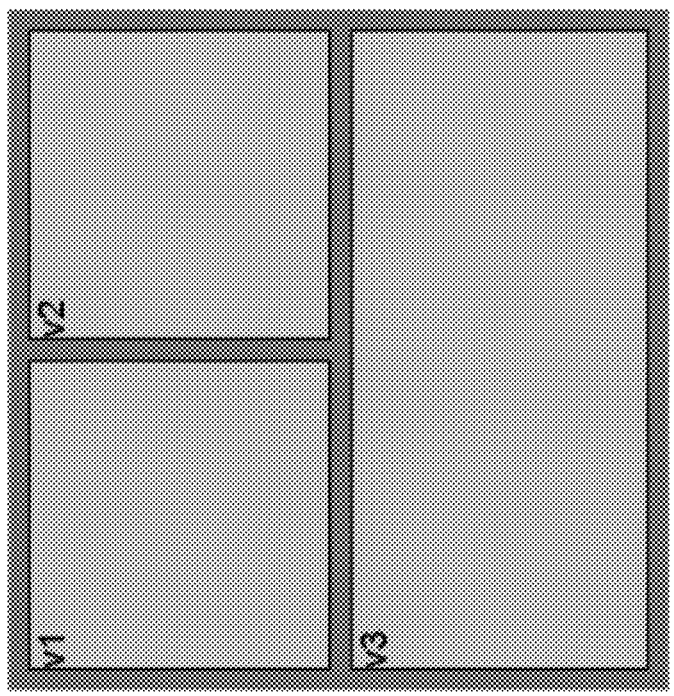
FIGS. 11A-11D illustrate an example for repositioning a visualization in accordance with some embodiments.
Figure 11A:
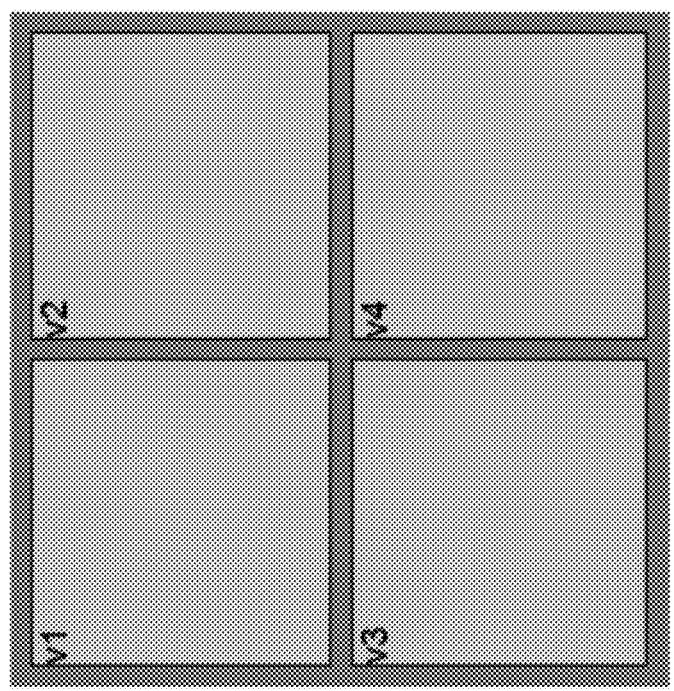
Figure 11D:
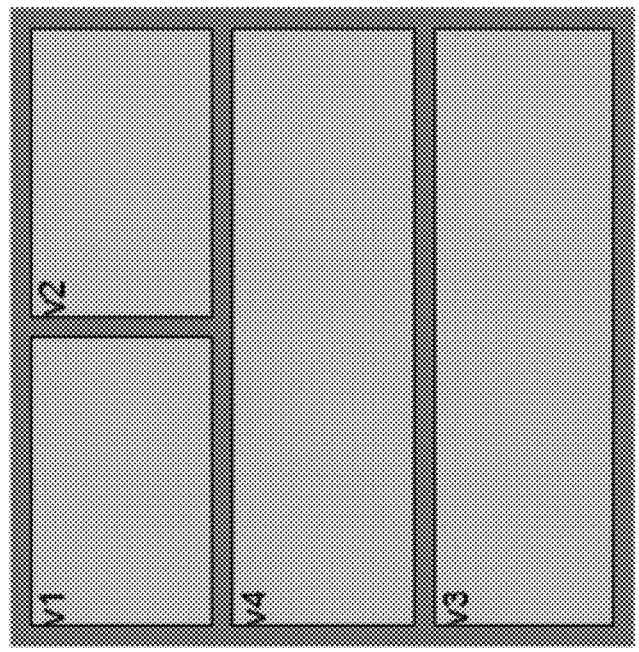
Figure 11C:
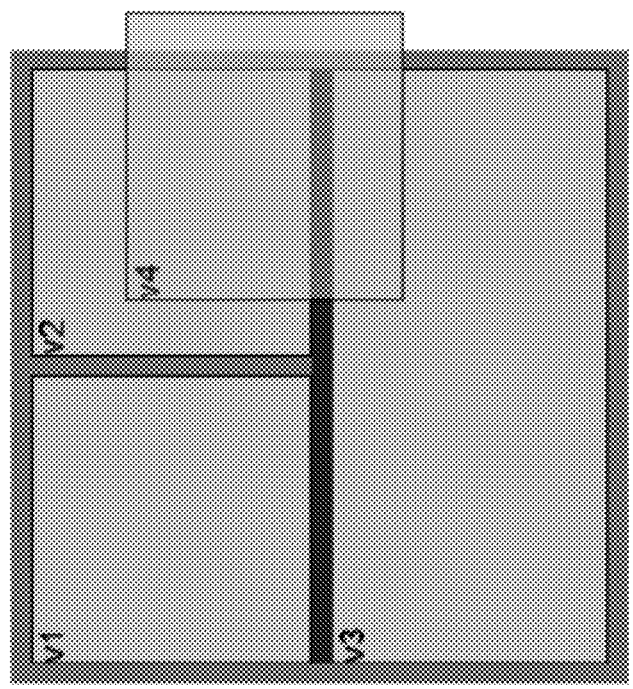

FIGS. 11A-11D illustrate an example for repositioning a visualization in accordance with some embodiments. To reposition a visualization such as V4 within a canvas layout shown by FIG. 11A, a user may select it and start dragging. In response to that, the visualization may be removed from the layout. As shown in FIG. 11B, the visualization V4 has been removed. The user may indicate an insertion point by dropping the viz at a region within the canvas layout. In some embodiments, an insertion bar can be shown that indicates an insertion point. FIG. 11C illustrates V4 being dropped at the edge between V3 and V1+V2 where the insertion bar is highlighted. Dropping the viz can add the viz at the insertion point. The sizing and positioning of the visualization may follow similar rules as the set of rules for adding a visualization. After the visualization is added according to the rules described above, a new GUI can be redrawn to reflect the repositioned visualization, as shown in FIG. 11D.

VII. Swapping Positions of Visualizations

In some embodiments, a user may swap the position of visualizations without worrying about affecting the overall layout format (e.g., size and position). Some embodiments can use a hotkey to trigger this special repositioning action. The layout may not update to indicate that the viz has been removed.

In an example in swapping the position of two visualizations, a user may hold down a hotkey before beginning the reposition. The layout may not update to fill the gap left by the repositioned first visualization. An insertion bar can indicate that the first visualization will swap positions with a second visualization. Dropping the visualization may result in the layout being updated to reflect the changes.

VIII. Resizing a Visualization

In some embodiments, since a split layout may not allow whitespace, any change in a visualization's size may result in changing at least one other visualization's size. To resize a viz, a user may move one of the visualization's shared edges. Some embodiments may enable a single edge resize and/or a multi-edge resize.

In a single edge resize, a user may grab a shared horizontal edge between two visualization's unit edges where a unit edge is used for single edge resize. An active edge can be highlighted to indicate which edge is being moved. Dragging down may force the top visualization's height to increase and the bottom visualization's height to decrease. On mouseup, current sizes may be locked in. Embodiments may ensure that min-heights are respected during a resize operation (e.g., a min size of 50). To assist during resize operations, some embodiments may provide two snap features including snap-to-edge (where active edge snaps to horizontal edge shared by two neighboring visualizations) and snap-to-equal-dimensions.

In a multi-edge resize, a user may select an edge intersection, which would allow the user to resize all the edges that share that intersection. The full edge for each edge at the intersection can be used. Embodiments enable the user to resize multiple visualizations that share a number of unit edges in a single action. In some embodiments, a user may resize along both the x and y axis. Some embodiments may enable using the hotkey to fix the axis used to move the edge, based on an initial drag movement.

In some embodiments, when resizing, the edges may try to snap to other edges. The edges may also try to snap when the content on either side of the edge is the same size. Further, some embodiments may highlight the edges that will be affected when a user starts dragging the edge (e.g., when the user's cursor is hovering over the edge). In some embodiments, the grid can be broken by quickly moving a visualization around and dropping it in its original position.

Further, in some embodiments, the ends of an edge gap can be used to control edge-span or full-span. For example, hovering over the middle of an edge may result in the inserting only spanning that edge. However, in some embodiments, hovering near the end of an edge may result in full-span. Some embodiments may also assign a hotkey to control the span range. Different embodiments may allow the modifications to the layout to be performed differently. Examples of how certain operations may be performed can be shown here:

Add Viz—Click and drag 'New Viz' onto layout

Delete Viz—Alt+Click Viz

Move Viz—Click and drag

Switch Position—Ctrl+Drag viz onto another viz

Resize—Grab edge and move along the perpendicular axis

Resize edges—Grab joint and move in any direction

Multi-resize edges (at edge joints) along with snap edges (align with other edges and equal width)

IX. Example Distributed System 12 depicts a simplified diagram of a distributed system 1200 for implementing an embodiment. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network 1210.

In various embodiments, server 1212 may be adapted to run one or more services or software applications such as services and applications that provide the document (e.g., webpage) analysis and modification-related processing. In certain embodiments, server 1212 may also provide other services or software applications that can include non-virtual and virtual environments. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

Figure 12:
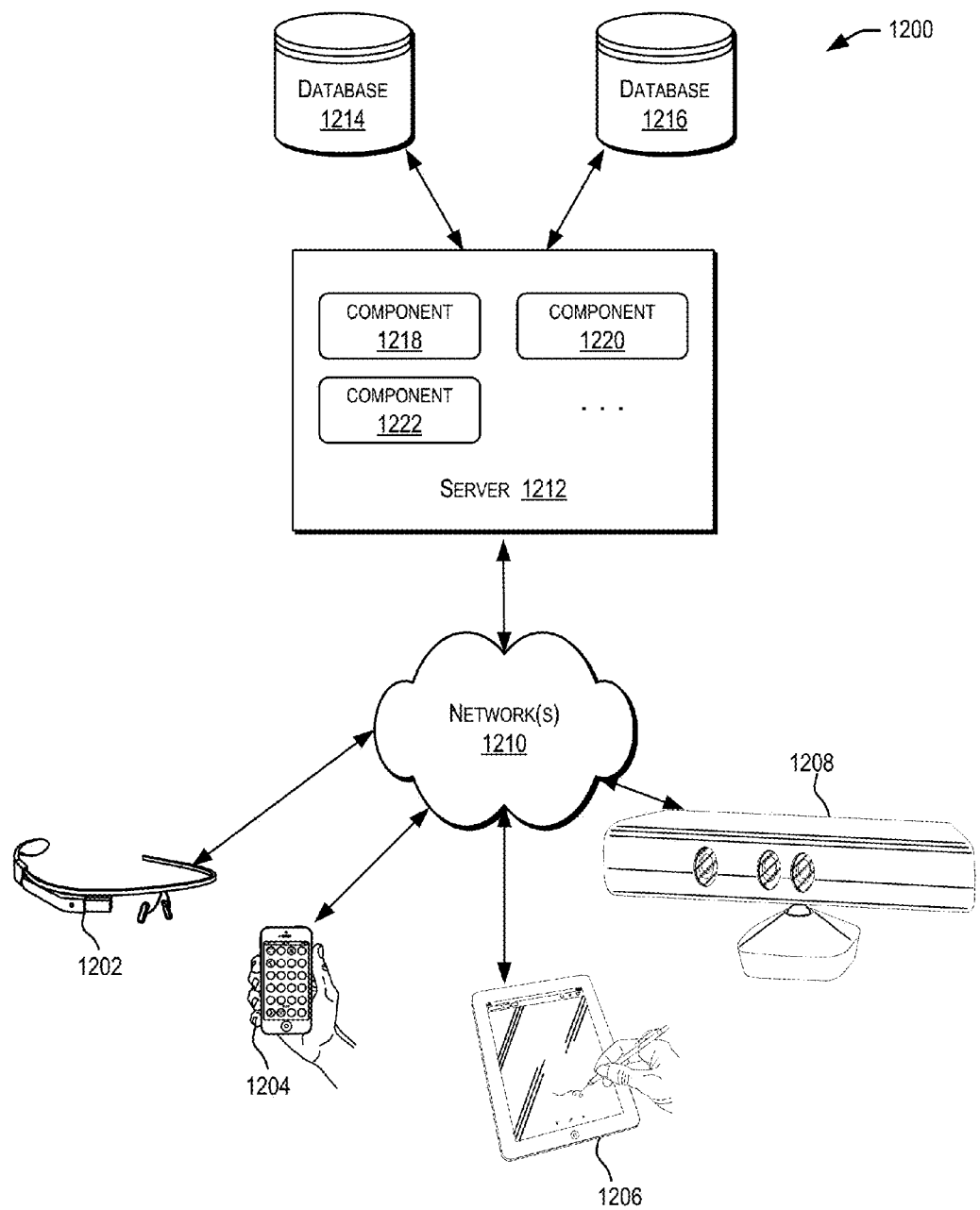
FIG. 12 depicts a simplified diagram of a distributed system for implementing an embodiment.

In the configuration depicted in FIG. 12, software components 1218, 1220 and 1222 of system 1200 are shown as being implemented on server 1212. In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in FIG. 12 is thus one example of a distributed system for implementing an embodiment system and is not intended to be limiting.

Client computing devices 1202, 1204, 1206, and/or 1208 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox® gaming console with or without a Kinect® gesture input device), and/or a personal messaging device, capable of communicating over network(s) 1210.

Although distributed system 1200 in FIG. 12 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1212 can include one or more virtual machines running virtual operating systems, or other computing architectures involving virtualization. One or more flexible pools of logical storage devices can be virtualized to maintain virtual storage devices for the server. Virtual networks can be controlled by server 1212 using software defined networking. In various embodiments, server 1212 may be adapted to run one or more services or software applications described in the foregoing disclosure. For example, server 1212 may correspond to a server for performing processing as described above according to an embodiment of the present disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. These databases may provide a mechanism for storing information such as user interactions information, usage patterns information, adaptation rules information, and other information used by embodiments of the present invention. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle, that are adapted to store, update, and retrieve data in response to SQL-formatted commands.

X. Example System Environment

Figure 13:
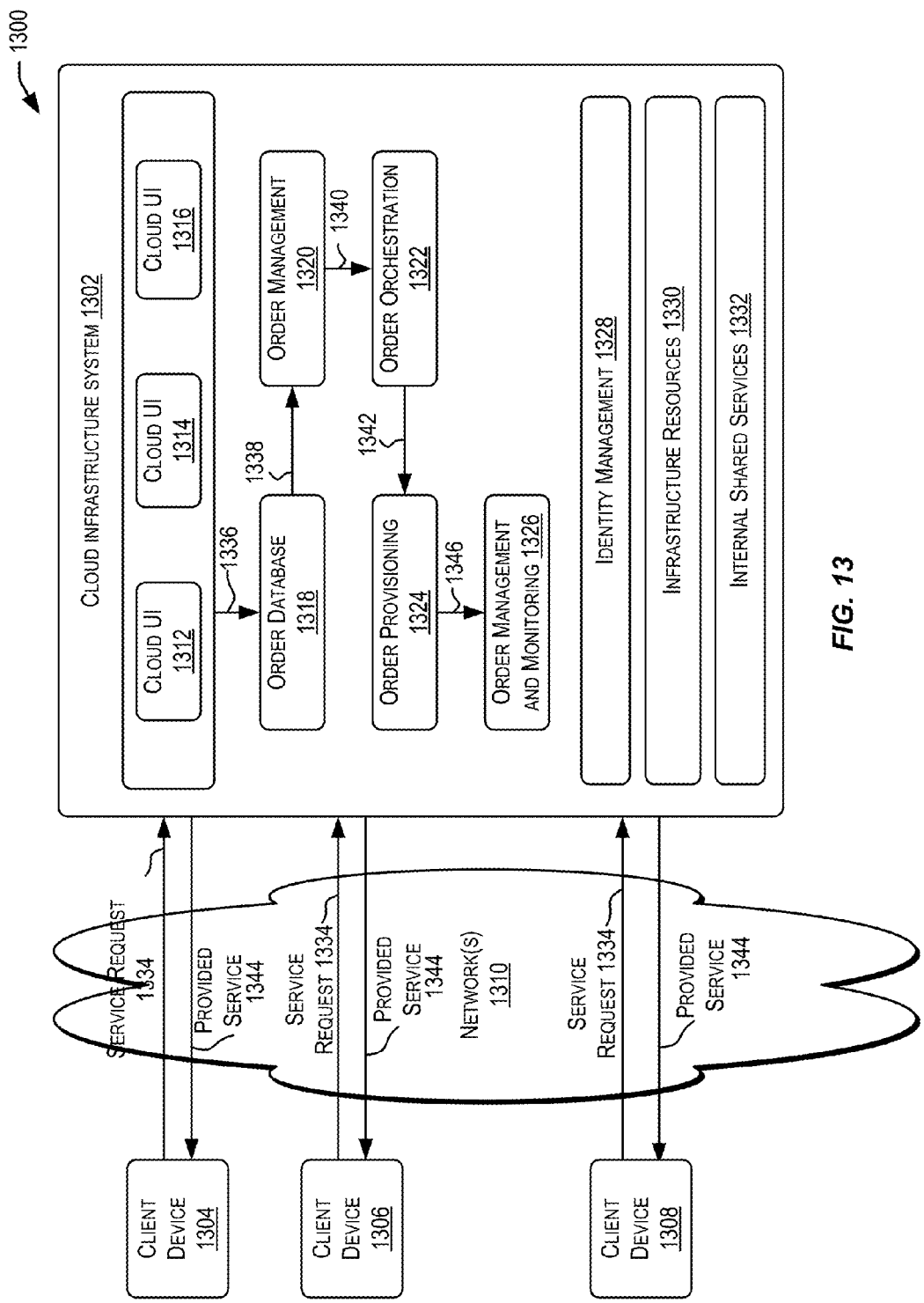
FIG. 13 is a simplified block diagram of one or more components of a system environment in which services may be offered as cloud services, in accordance with an embodiment of the present disclosure.

In some embodiments, the document analysis and modification services described above may be offered as services via a cloud environment. FIG. 13 is a simplified block diagram of one or more components of a system environment 1300 in which services may be offered as cloud services, in accordance with an embodiment of the present disclosure. In the illustrated embodiment in FIG. 13, system environment 1300 includes one or more client computing devices 1304, 1306, and 1308 that may be used by users to interact with a cloud infrastructure system 1302 that provides cloud services, including services for dynamically modifying documents (e.g., webpages) responsive to usage patterns. Cloud infrastructure system 1302 may comprise one or more computers and/or servers that may include those described above for server 1212.

It should be appreciated that cloud infrastructure system 1302 depicted in FIG. 13 may have other components than those depicted. Further, the embodiment shown in FIG. 13 is only one example of a cloud infrastructure system that may incorporate an embodiment of the invention. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1202, 1204, 1206, and 1208. Client computing devices 1304, 1306, and 1308 may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302. Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1210.

In certain embodiments, services provided by cloud infrastructure system 1302 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1302 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's website.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1302 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle Corporation) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1302 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1302 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform, and other resources.

In some embodiments, resources in cloud infrastructure system 1302 may be shared by multiple users and dynamically re-allocated per demand. Additionally, resources may be allocated to users in different time zones. For example, cloud infrastructure system 1302 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 to enable provision of services by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in FIG. 13, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In an exemplary operation, at 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI) such as cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

At 1336, the order information received from the customer may be stored in an order database 1318. If this is a new order, a new record may be created for the order. In one embodiment, order database 1318 can be one of several databases operated by cloud infrastructure system 1318 and operated in conjunction with other system elements.

At 1338, the order information may be forwarded to an order management module 1320 that may be configured to perform billing and accounting functions related to the order, such as verifying the order, and upon verification, booking the order.

At 1340, information regarding the order may be communicated to an order orchestration module 1322 that is configured to orchestrate the provisioning of services and resources for the order placed by the customer. In some instances, order orchestration module 1322 may use the services of order provisioning module 1324 for the provisioning. In certain embodiments, order orchestration module 1322 enables the management of business processes associated with each order and applies business logic to determine whether an order should proceed to provisioning.

As shown in the embodiment depicted in FIG. 13, at 1342, upon receiving an order for a new subscription, order orchestration module 1322 sends a request to order provisioning module 1324 to allocate resources and configure resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. This enables order orchestration module 1322 to be isolated from implementation details, such as whether or not services and resources are actually provisioned on the fly or pre-provisioned and only allocated/assigned upon request.

At 1344, once the services and resources are provisioned, a notification may be sent to the subscribing customers indicating that the requested service is now ready for use. In some instance, information (e.g. a link) may be sent to the customer that enables the customer to start using the requested services.

At 1346, a customer's subscription order may be managed and tracked by an order management and monitoring module 1326. In some instances, order management and monitoring module 1326 may be configured to collect usage statistics regarding a customer use of subscribed services. For example, statistics may be collected for the amount of storage used, the amount of data transferred, the number of users, and the amount of system up time and system down time, and the like.

In certain embodiments, cloud infrastructure system 1300 may include an identity management module 1328 that is configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

XI. Example Computer System

Figure 14:
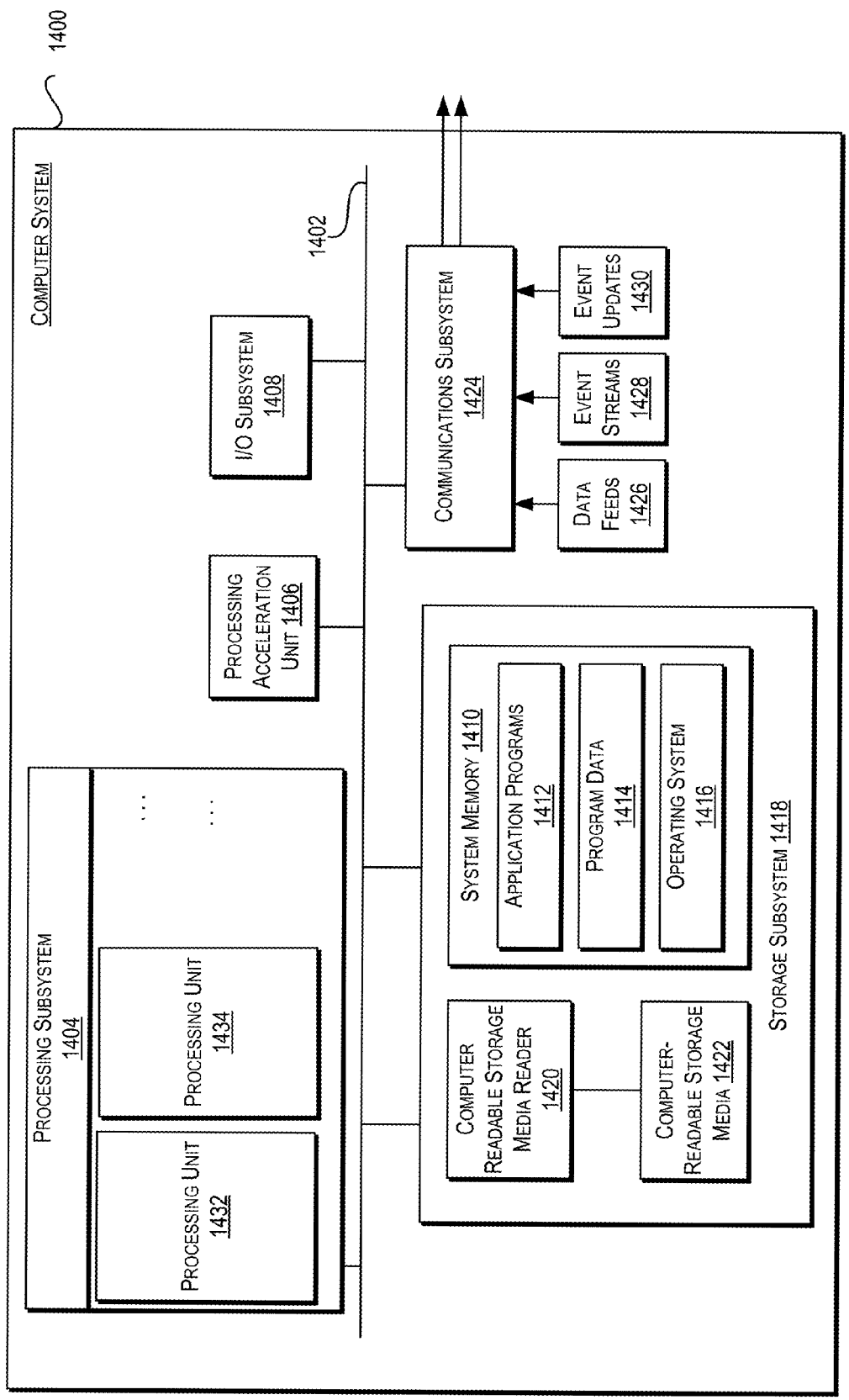
FIG. 14 illustrates an exemplary computer system that may be used to implement an embodiment of the present invention.

FIG. 14 illustrates an exemplary computer system 1400 that may be used to implement an embodiment of the present invention. In some embodiments, computer system 1400 may be used to implement any of the various servers and computer systems described above. As shown in FIG. 14, computer system 1400 includes various subsystems including a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 may include tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1404 controls the operation of computer system 1400 and may comprise one or more processing units 1432, 1434, etc. A processing unit may include be one or more processors, including single core or multicore processors, one or more cores of processors, or combinations thereof. In some embodiments, processing subsystem 1404 can include one or more special purpose co-processors such as graphics processors, digital signal processors (DSPs), or the like. In some embodiments, some or all of the processing units of processing subsystem 1404 can be implemented using customized circuits, such as application specific integrated circuits (ASICs), or field programmable gate arrays (FPGAs).

In some embodiments, the processing units in processing subsystem 1404 can execute instructions stored in system memory 1410 or on computer readable storage media 1422. In various embodiments, the processing units can execute a variety of programs or code instructions and can maintain multiple concurrently executing programs or processes. At any given time, some or all of the program code to be executed can be resident in system memory 1410 and/or on computer-readable storage media 1422 including potentially on one or more storage devices. Through suitable programming, processing subsystem 1404 can provide various functionalities described above for dynamically modifying documents (e.g., webpages) responsive to usage patterns.

In certain embodiments, a processing acceleration unit 1406 may be provided for performing customized processing or for off-loading some of the processing performed by processing subsystem 1404 so as to accelerate the overall processing performed by computer system 1400.

I/O subsystem 1408 may include devices and mechanisms for inputting information to computer system 1400 and/or for outputting information from or via computer system 1400. In general, use of the term "input device" is intended to include all possible types of devices and mechanisms for inputting information to computer system 1400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1418 provides a repository or data store for storing information that is used by computer system 1400. Storage subsystem 1418 provides a tangible non-transitory computer-readable storage medium for storing the basic programming and data constructs that provide the functionality of some embodiments. Software (programs, code modules, instructions) that when executed by processing subsystem 1404 provide the functionality described above may be stored in storage subsystem 1418. The software may be executed by one or more processing units of processing subsystem 1404. Storage subsystem 1418 may also provide a repository for storing data used in accordance with the present invention.

Storage subsystem 1418 may include one or more non-transitory memory devices, including volatile and non-volatile memory devices. As shown in FIG. 14, storage subsystem 1418 includes a system memory 1410 and a computer-readable storage media 1422. System memory 1410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1400, such as during start-up, may typically be stored in the ROM. The RAM typically contains data and/or program modules that are presently being operated and executed by processing subsystem 1404. In some implementations, system memory 1410 may include multiple different types of memory, such as static random access memory (SRAM) or dynamic random access memory (DRAM).

By way of example, and not limitation, as depicted in FIG. 14, system memory 1410 may store application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1422 may store programming and data constructs that provide the functionality of some embodiments. Software (programs, code modules, instructions) that, when executed by processing subsystem 1404 provides the functionality described above, may be stored in storage subsystem 1418. By way of example, computer-readable storage media 1422 may include non-volatile memory such as a hard disk drive, a magnetic disk drive, an optical disk drive such as a CD ROM, DVD, a Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1422 may provide storage of computer-readable instructions, data structures, program modules, and other data for computer system 1400.

In certain embodiments, storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for storing computer-readable information.

In certain embodiments, computer system 1400 may provide support for executing one or more virtual machines. Computer system 1400 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1400. Accordingly, multiple operating systems may potentially be run concurrently by computer system 1400. Each virtual machine generally runs independently of the other virtual machines.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to establish a communication channel to one or more client devices via the Internet for receiving and sending information from and to the client devices. For example, visual analyzer system 102 depicted in FIG. 1 may receive user interactions information and webpage requests from client devices using communication subsystem 1424. Additionally, communication subsystem 1424 may be used to communicate webpages from visual analyzer system 102 to the requesting clients.

Communication subsystem 1424 may support both wired and/or wireless communication protocols. For example, in certain embodiments, communications subsystem 1424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

Communication subsystem 1424 can receive and transmit data in various forms. For example, in some embodiments, communications subsystem 1424 may receive input communication in the form of structured and/or unstructured data feeds 1426, event streams 1428, event updates 1430, and the like. For example, communications subsystem 1424 may be configured to receive (or send) data feeds 1426 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1424 may be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1400 depicted in FIG. 14 is intended only as a specific example. Many other configurations having more or fewer components than the system depicted in FIG. 14 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
    displaying, by one or more processors, a graphical user interface (GUI) comprising a plurality of components in a display area, wherein each of the plurality of components has one or more initial dimensions;
    in response to an event, determining an edge corresponding to the event, wherein the event includes one of an insertion of a component, a deletion of a component, a repositioning of a component, or a resizing of a component;
    determining a box based on the edge, wherein the box encloses a portion of the display area that is less than the entire display area;
    determining a set of components corresponding to the box, the set of components being fewer than all of the plurality of components; and
    redrawing the GUI such that the set of components is redrawn,
    wherein, after redrawing the GUI, at least one dimension of each component of the set of components corresponding to the box is different from an initial dimension of each component of the set of components,
wherein the at least one dimension is a height or width of each component,
wherein the at least one dimension of each component of the set of components is resized at a same percentage, and
wherein components outside of the box are not resized.

2. The method of claim 1, wherein determining the box includes:
identifying one or more perpendicular edges that intersect the ends of the edge corresponding to the event;
determining the shorter edge of the one or more perpendicular edges; and
identifying a portion of the display area encompassing the edge corresponding to the event and the shorter edge, wherein the box is determined by determining a boundary for the portion of the display area.

3. The method of claim 1, wherein the edge corresponding to the event is visually shown to the user, and wherein a length of the edge may be determined based on a movement of the cursor.

4. The method of claim 1, further comprising:
determining the at least one dimension of each component of the set of components to be redrawn, wherein the determining the at least one dimension includes:
calculating a maximum number of components within the box that are intersected by a line perpendicular to the edge corresponding to the event;
determining whether the edge corresponding to the event is a horizontal edge or a vertical edge;
scaling the height of each component of the set of components if the edge corresponding to the event is a horizontal edge; and
scaling the width of each component of the set of components if the edge corresponding to the event is a vertical edge.

5. The method of claim 1, wherein each component is a data visualization.

6. A system comprising:
one or more processors; and
memory coupled to the one or more processors, the memory encoded with a set of instructions configured to perform a process comprising:
displaying, by the one or more processors, a graphical user interface (GUI) comprising a plurality of components in a display area, wherein each of the plurality of components has one or more initial dimensions;
in response to an event, determining an edge corresponding to the event; determining a box based on the edge, wherein the box encloses a portion of the display area that is less than the entire display area, wherein the event includes one of an insertion of a component, a deletion of a component, a repositioning of a component, or a resizing of a component;
determining a set of components corresponding to the box, the set of components being fewer than all of the plurality of components; and
redrawing the GUI such that the set of components is redrawn,
wherein, after redrawing the GUI, at least one dimension of each component of the set of components corresponding to the box is different from an initial dimension of each component of the set of components,
wherein the at least one dimension is a height or width of each component,
wherein the at least one dimension of each component of the set of components is resized at a same percentage, and
wherein components outside of the box are not resized.

7. The system of claim 6, wherein determining the box includes:
identifying one or more perpendicular edges that intersect the ends of the edge corresponding to the event;
determining the shorter edge of the one or more perpendicular edges; and identifying a portion of the display area encompassing the edge corresponding to the event and the shorter edge, wherein the box is determined by determining a boundary for the portion of the display area.

8. The system of claim 6, wherein the edge corresponding to the event is visually shown to the user, and wherein a length of the edge may be determined based on a movement of the cursor.

9. The system of claim 6, wherein the set of instructions are further configured to perform the process comprising:
determining the at least one dimension of each component of the set of components to be redrawn, wherein the determining the at least one dimension includes:
calculating a maximum number of components within the box that are intersected by a line perpendicular to the edge corresponding to the event;
determining whether the edge corresponding to the event is a horizontal edge or a vertical edge;
scaling the height of each component of the set of components if the edge corresponding to the event is a horizontal edge; and
scaling the width of each component of the set of components if the edge corresponding to the event is a vertical edge.

10. The system of claim 6, wherein each component is a data visualization.

11. A non-transitory computer readable storage medium storing instructions that, when executed by one or more processors of a first computing device, cause the first computing device to perform operations comprising:
displaying, by the one or more processors, a graphical user interface (GUI) comprising a plurality of components in a display area, wherein each of the plurality of components has one or more initial dimensions;
in response to an event, determining an edge corresponding to the event, wherein the event includes one of an insertion of a component, a deletion of a component, a repositioning of a component, or a resizing of a component;
determining a set of components corresponding to the box, the set of components being fewer than all of the plurality of components; and
redrawing the GUI such that the set of components is redrawn,
wherein, after redrawing the GUI, at least one dimension of each component of the set of components corresponding to the box is different from an initial dimension of each component of the set of components,
wherein the at least one dimension is a height or width of each component,
wherein the at least one dimension of each component of the set of components is resized at a same percentage, and
wherein components outside of the box are not resized.

12. The computer readable storage medium of claim 11, wherein determining the box includes:

identifying one or more perpendicular edges that intersect the ends of the edge corresponding to the event;

determining the shorter edge of the one or more perpendicular edges; and identifying a portion of the display area encompassing the edge corresponding to the event and the shorter edge, wherein the box is determined by determining a boundary for the portion of the display area.

13. The computer readable storage medium of claim 11, wherein the edge corresponding to the event is visually shown to the user, and wherein a length of the edge may be determined based on a movement of the cursor.

14. The method of claim 1, wherein the instructions further cause the first computing device to perform operations comprising:

determining the at least one dimension of each component of the set of components to be redrawn, wherein the determining the at least one dimension includes:

calculating a maximum number of components within the box that are intersected by a line perpendicular to the edge corresponding to the event;

determining whether the edge corresponding to the event is a horizontal edge or a vertical edge;

scaling the height of each component of the set of components if the edge corresponding to the event is a horizontal edge; and scaling the width of each component of the set of components if the edge corresponding to the event is a vertical edge.

* * * * *